United States Patent
Strong et al.

(10) Patent No.: US 9,731,780 B2
(45) Date of Patent: Aug. 15, 2017

(54) TRAILER HITCH

(71) Applicants: Brooks Strong, Houston, TX (US); Joshua Cayne Fisher, Montgomery, TX (US)

(72) Inventors: Brooks Strong, Houston, TX (US); Joshua Cayne Fisher, Montgomery, TX (US)

( * ) Notice: Subject to any disclaimer, the term of this patent is extended or adjusted under 35 U.S.C. 154(b) by 0 days.

(21) Appl. No.: 14/803,041

(22) Filed: Jul. 18, 2015

(65) Prior Publication Data
US 2017/0015371 A1 Jan. 19, 2017

(51) Int. Cl.
*B62D 53/04* (2006.01)
*B62D 53/06* (2006.01)

(52) U.S. Cl.
CPC .......... *B62D 53/04* (2013.01); *B62D 53/062* (2013.01)

(58) Field of Classification Search
CPC ....... B62D 53/04; B62D 53/06; B62D 53/062
USPC ...................................... 280/425.1
See application file for complete search history.

(56) References Cited

U.S. PATENT DOCUMENTS

| | | | | |
|---|---|---|---|---|
| 3,112,100 A * | 11/1963 | Prichard | ............... | B28C 5/4203 193/10 |
| 3,912,293 A * | 10/1975 | Harbers | ............... | B60G 17/052 180/24.02 |
| 4,063,779 A * | 12/1977 | Martin | ................ | B62D 61/125 180/24.02 |
| 4,848,783 A * | 7/1989 | Christenson | ......... | B62D 61/125 280/405.1 |
| 5,458,355 A * | 10/1995 | Young | ................... | B62D 61/12 180/24.02 |
| 5,540,454 A * | 7/1996 | VanDenberg | .......... | B62D 61/12 180/209 |
| 5,549,322 A * | 8/1996 | Hauri | ..................... | B62D 61/12 180/209 |
| 5,597,174 A * | 1/1997 | Christenson | ............. | B60G 5/04 180/209 |
| 5,626,356 A * | 5/1997 | Harwood | ............. | B62D 53/068 280/405.1 |
| 5,667,231 A * | 9/1997 | Dierks | .................... | B60P 1/027 280/149.2 |
| 5,823,629 A * | 10/1998 | Smith | ...................... | B60G 9/02 180/209 |
| 6,189,901 B1 * | 2/2001 | Smith | ...................... | B60G 9/00 180/209 |
| 6,247,712 B1 * | 6/2001 | Smith | .................... | B62D 61/12 180/209 |

(Continued)

*Primary Examiner* — Kevin Hurley
*Assistant Examiner* — Michael Stabley
(74) *Attorney, Agent, or Firm* — Ronald L. Phillips

(57) ABSTRACT

A trailer hitch for hitching a trailer to a motor vehicle is disclosed wherein the motor vehicle has a chassis supported by axles suspended from the motor vehicle chassis, the trailer has a chassis supported by one or more axles suspended from the trailer chassis, and the trailer hitch is adapted to hitch the trailer chassis to the motor vehicle chassis for movement therewith and also cause the trailer chassis to help support the motor vehicle chassis to a variable degree via the trailer hitch and in a manner determined by the spring action provided by the trailer axle suspension system(s). And wherein the trailer hitch is also adapted to allow the hitched trailer chassis to turn with respect to the motor vehicle chassis and prevent such turning and to stow a hitched trailer chassis on the motor vehicle.

46 Claims, 25 Drawing Sheets

(56) References Cited

U.S. PATENT DOCUMENTS

| | | | | |
|---|---|---|---|---|
| 6,733,028 B2* | 5/2004 | Teeple | ............... | B60D 1/06 280/461.1 |
| 6,761,413 B1* | 7/2004 | Mathews | ............... | B60P 1/16 298/18 |
| 6,820,887 B1* | 11/2004 | Riggle | ............... | B62D 53/0864 280/405.1 |
| 7,731,208 B2* | 6/2010 | Strong | ............... | B62D 61/12 180/209 |
| 7,775,308 B2* | 8/2010 | Strong | ............... | B62D 61/12 180/209 |
| 7,775,533 B2* | 8/2010 | Strong | ............... | B60T 13/683 180/24.02 |
| 7,841,604 B2* | 11/2010 | Mitchell | ............... | B60D 1/04 280/86.5 |
| 8,523,202 B1* | 9/2013 | Strong | ............... | B62D 61/12 180/209 |
| 8,523,203 B1* | 9/2013 | Strong | ............... | B62D 61/12 180/24.02 |
| 8,777,324 B2* | 7/2014 | Wink | ............... | B60P 1/286 298/19 R |
| 8,919,802 B2* | 12/2014 | Knight | ............... | B60D 1/665 280/404 |
| 2003/0038454 A1* | 2/2003 | Valencia | ............... | B60D 1/075 280/511 |
| 2008/0231016 A1* | 9/2008 | Wall | ............... | B62D 53/062 280/405.1 |

* cited by examiner

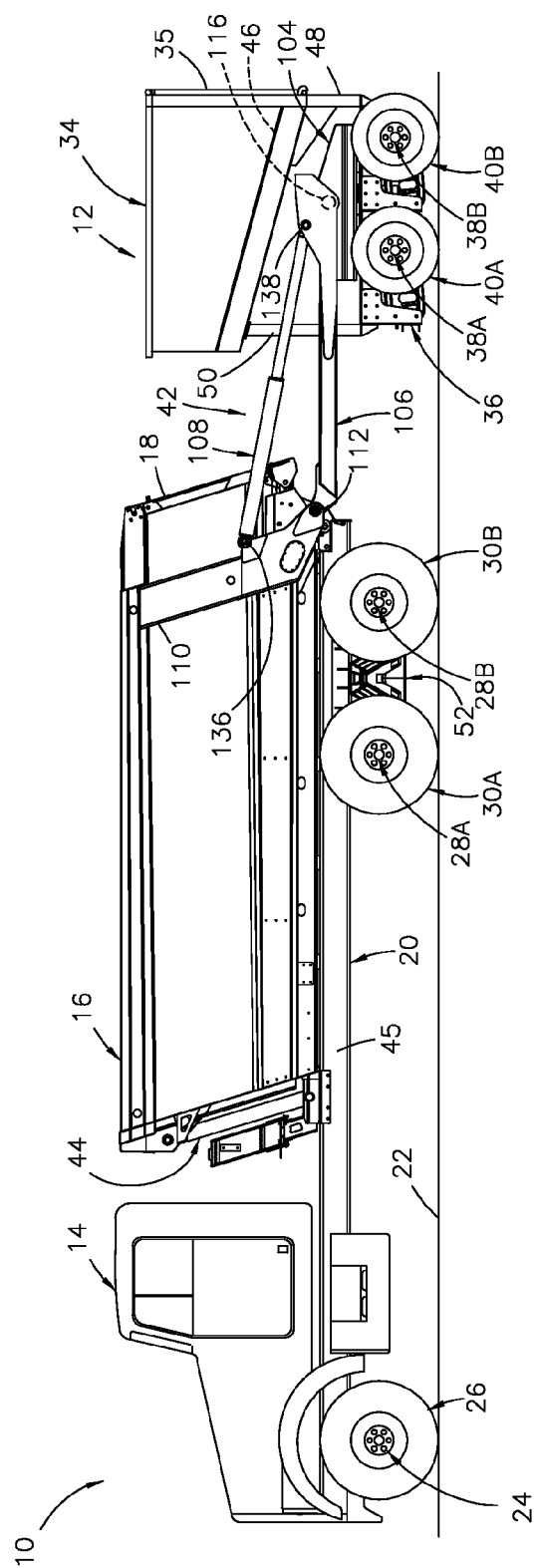

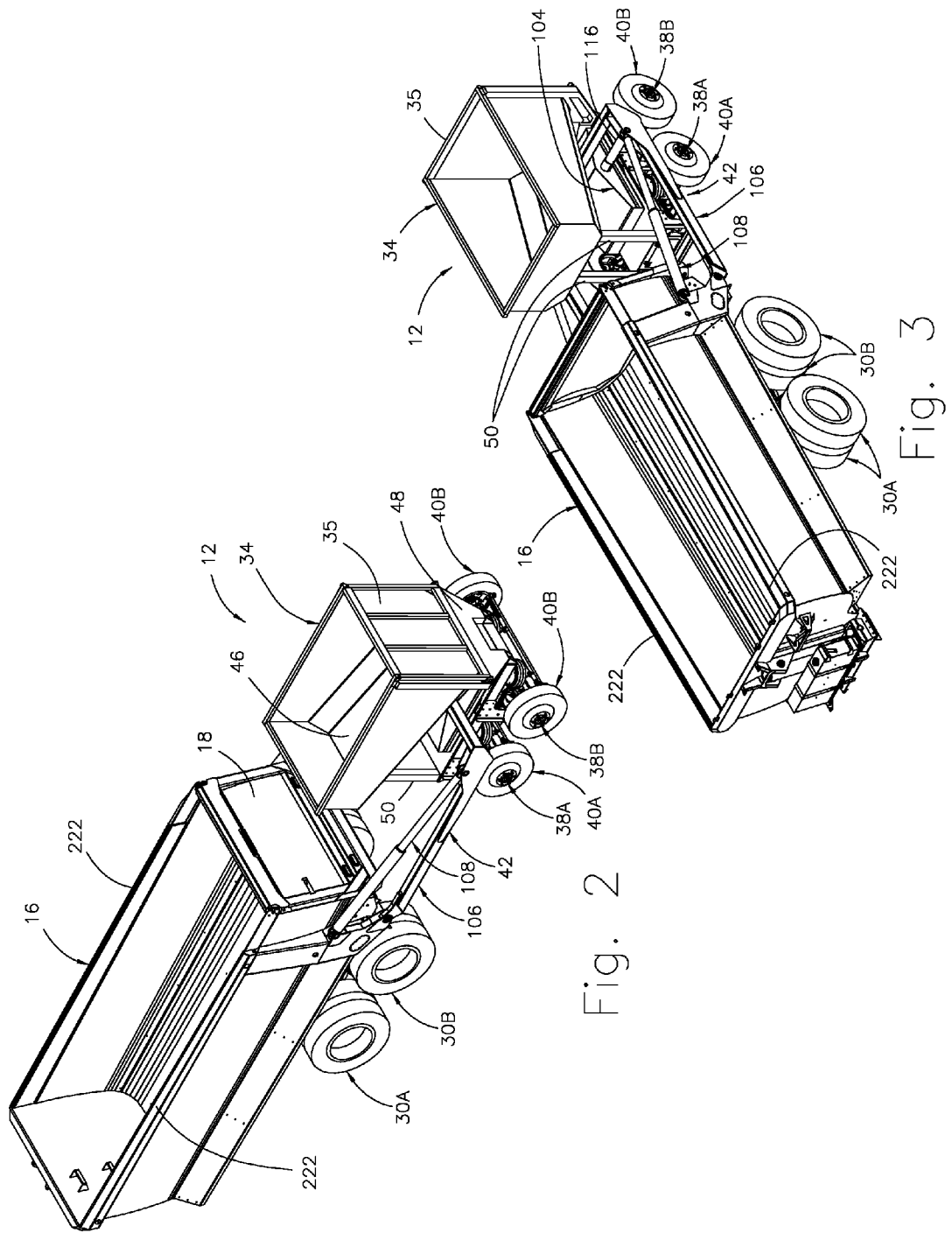

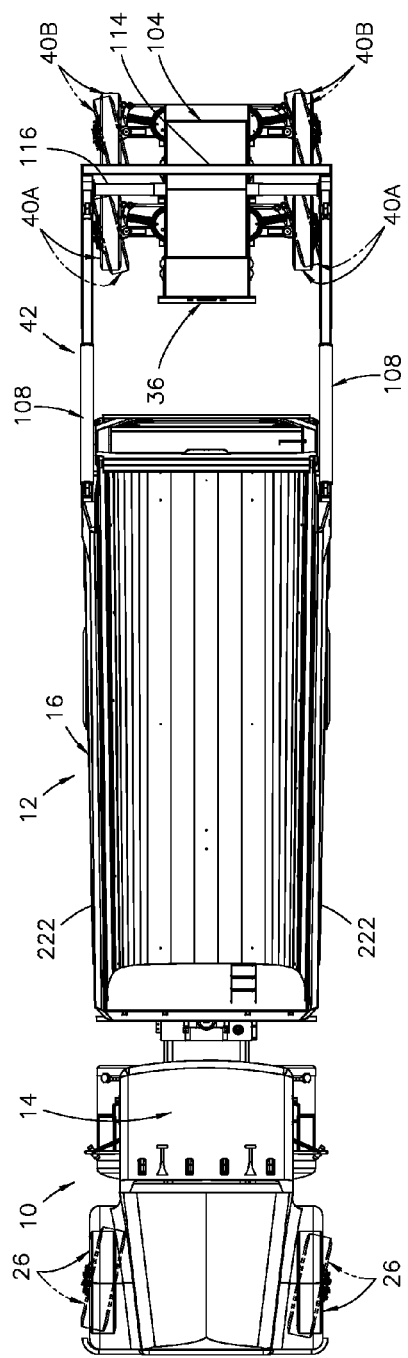
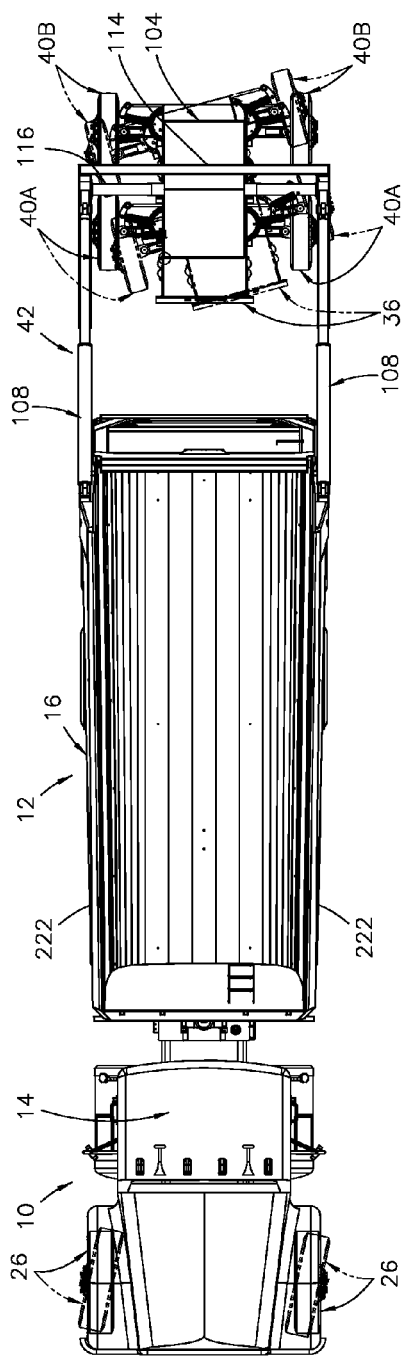

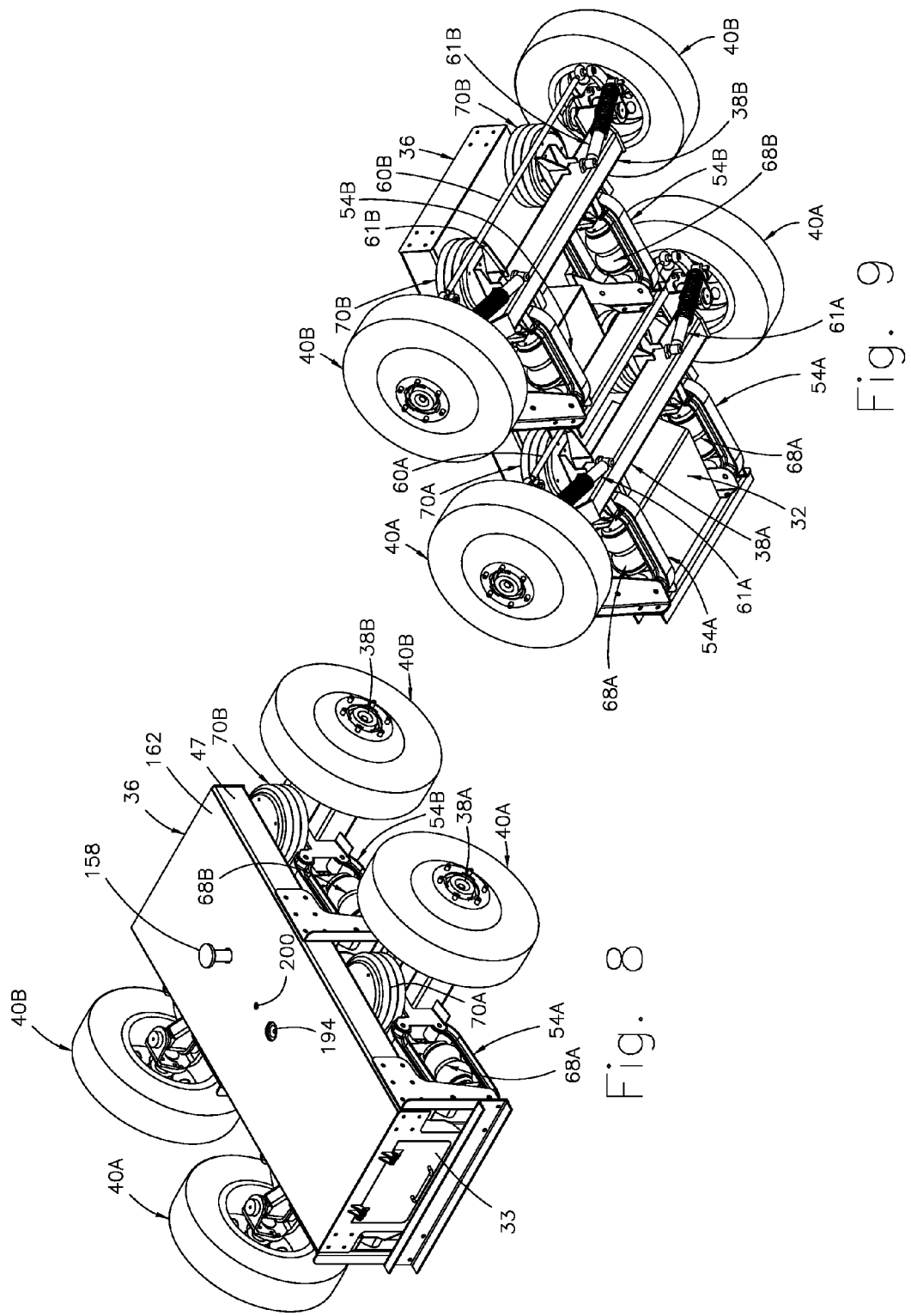

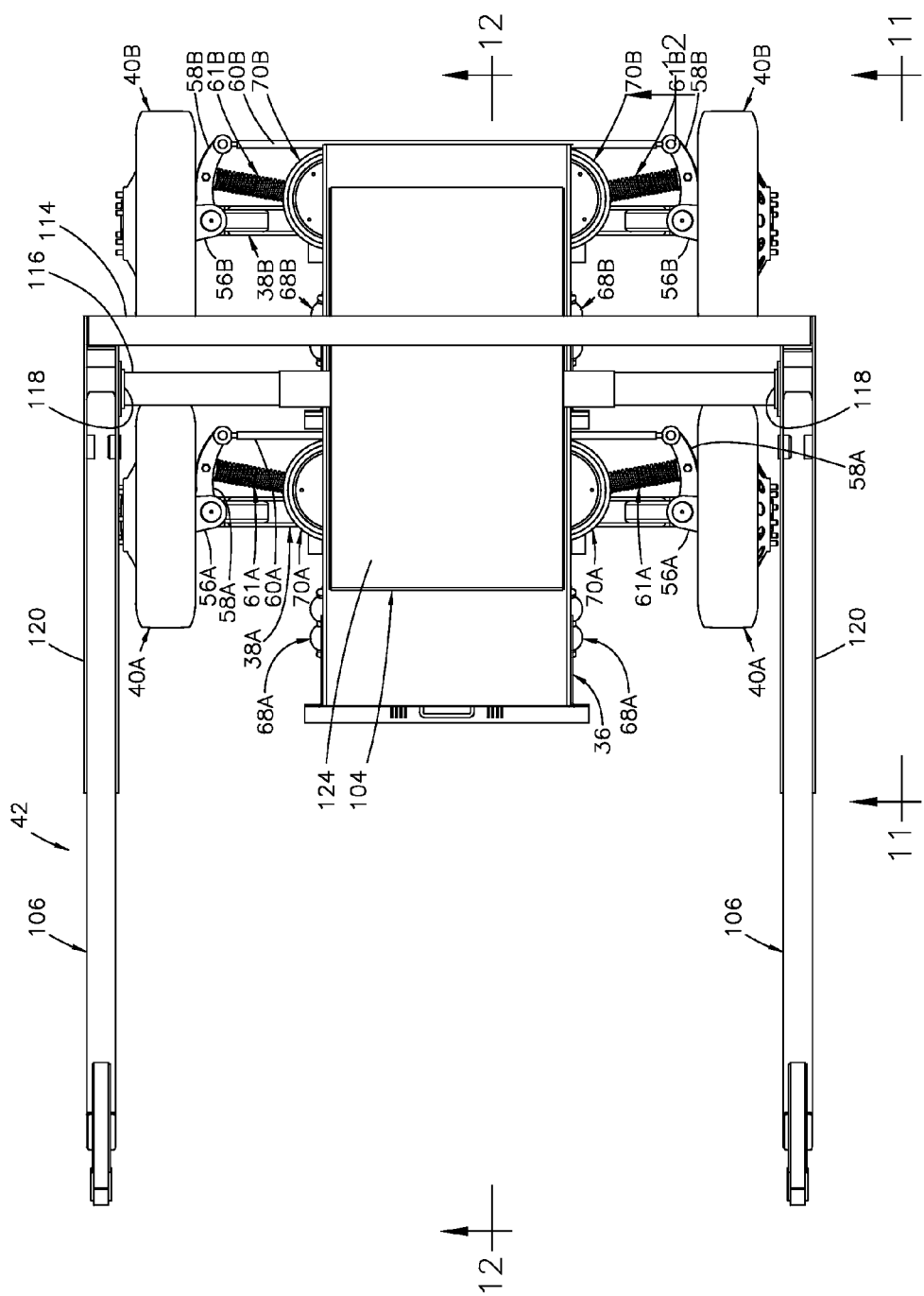

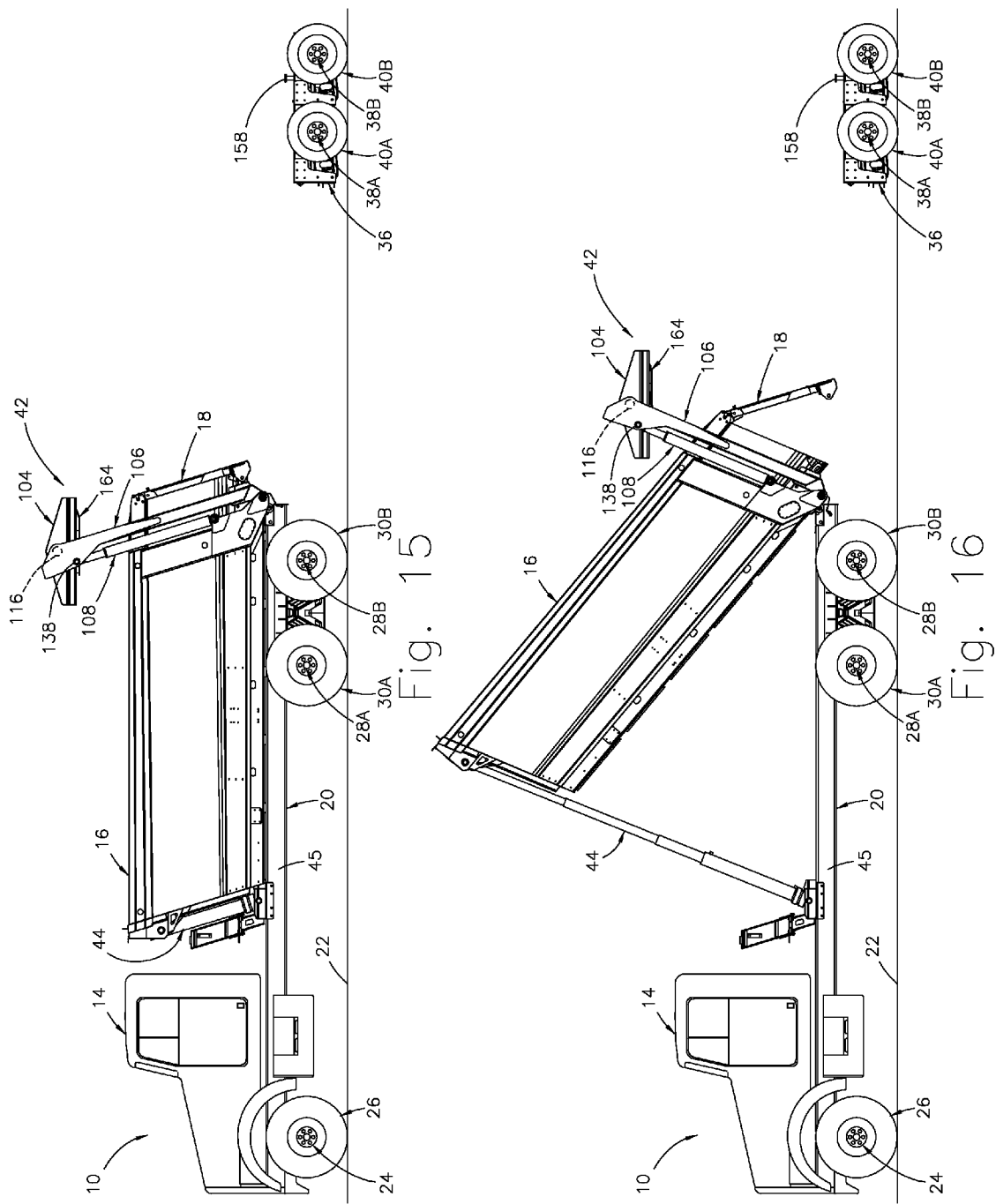

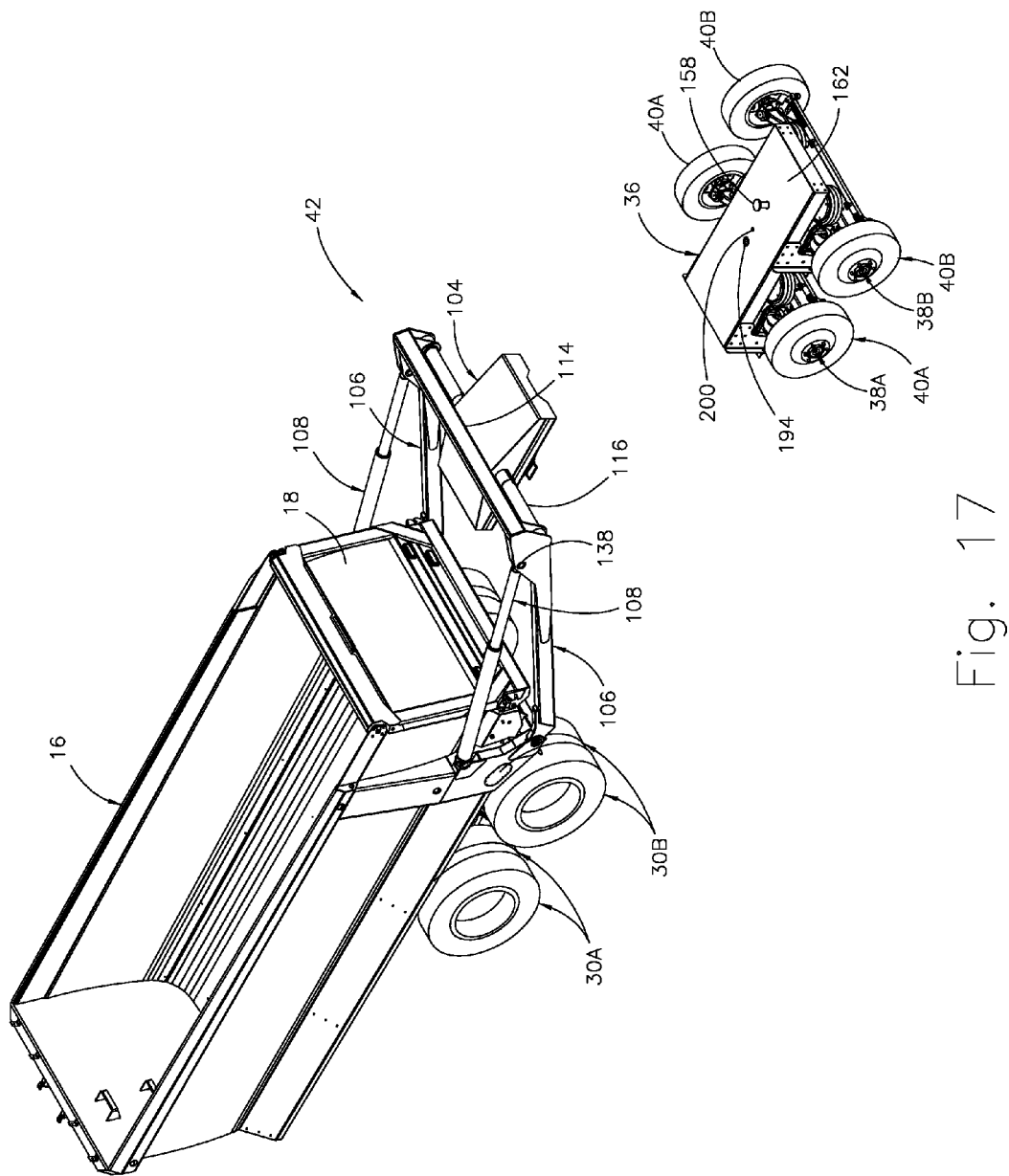

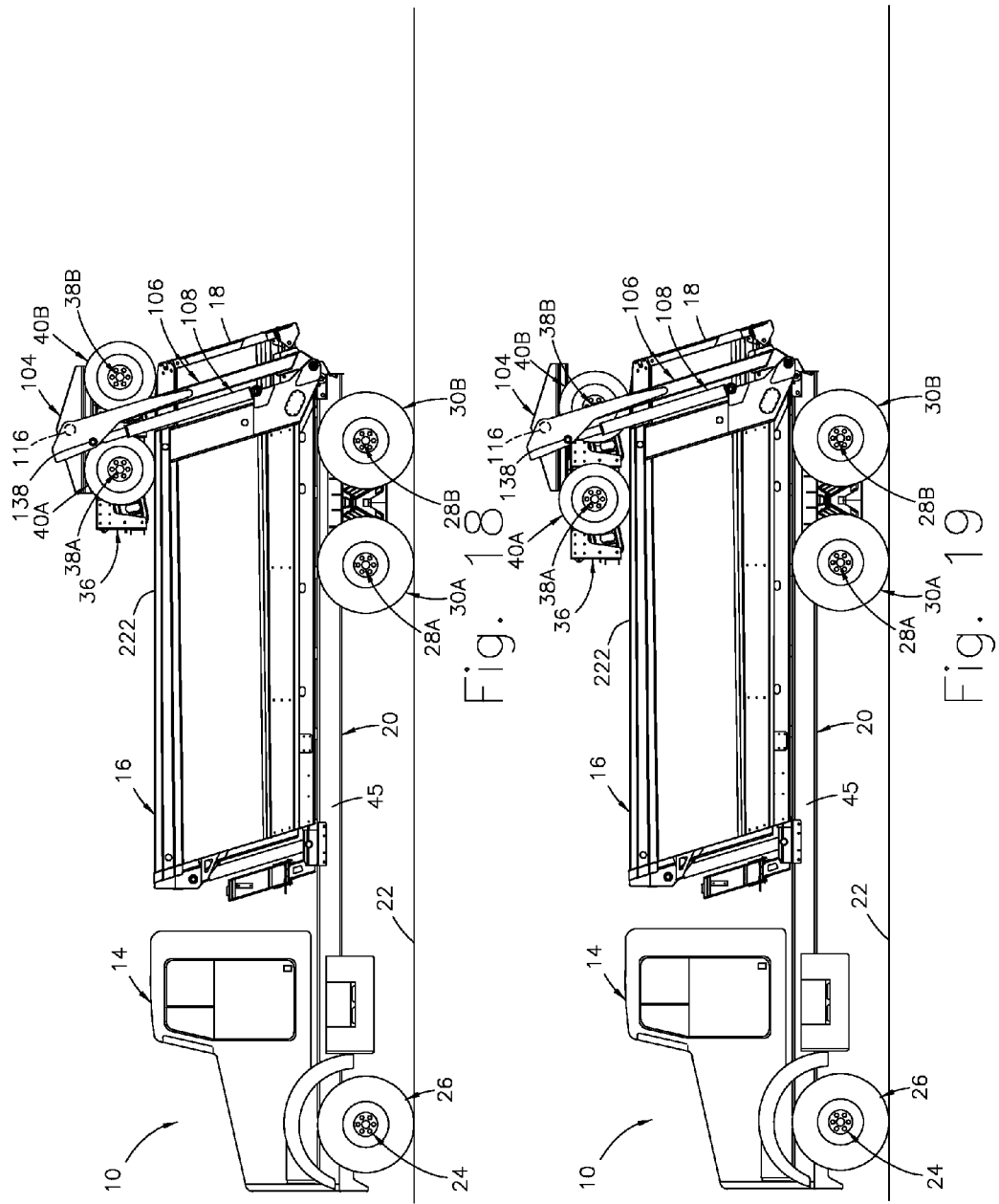

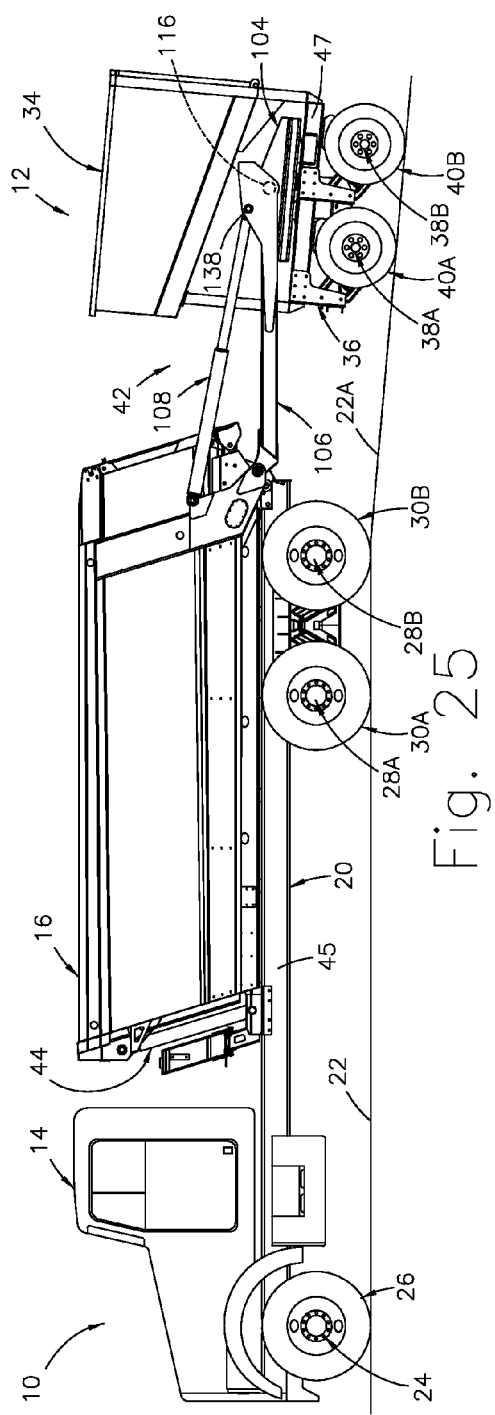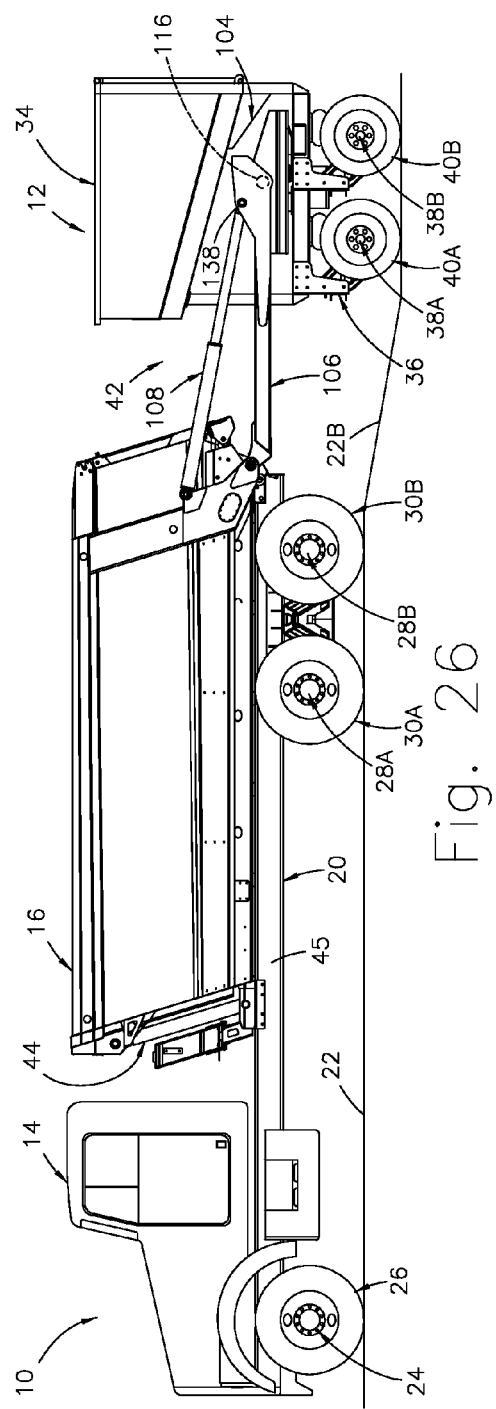

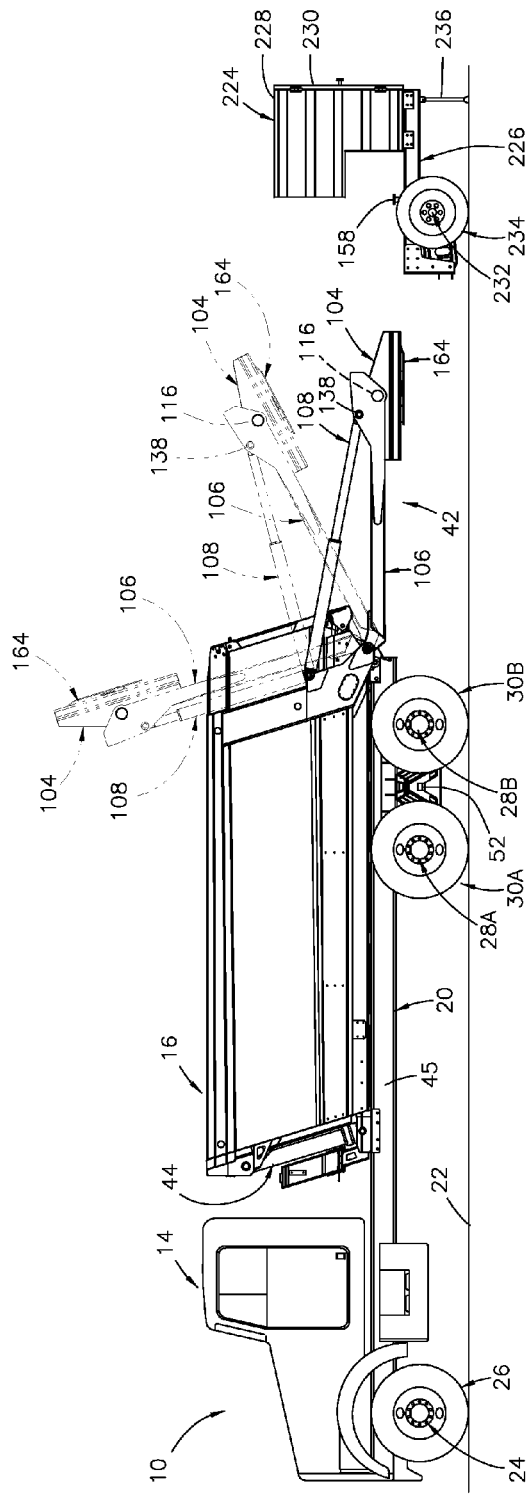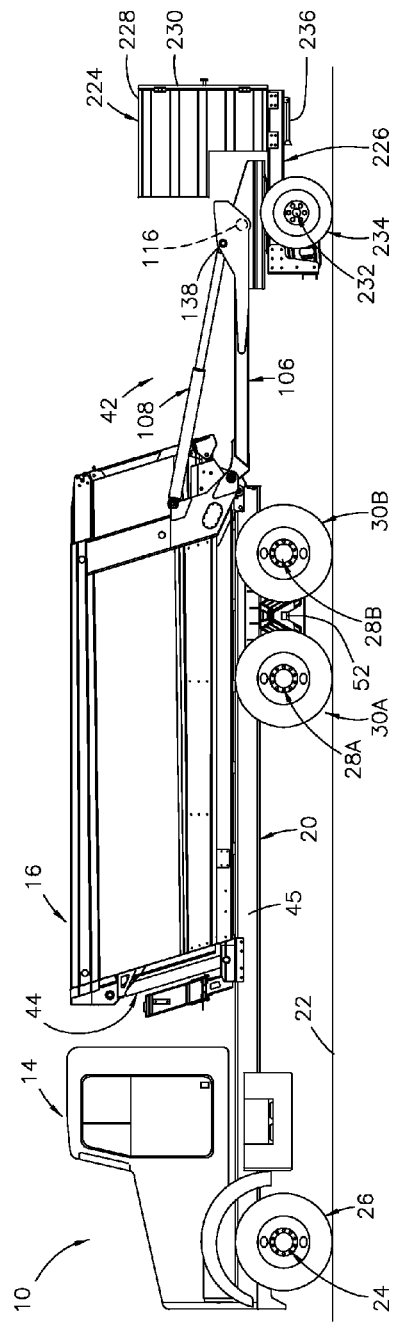

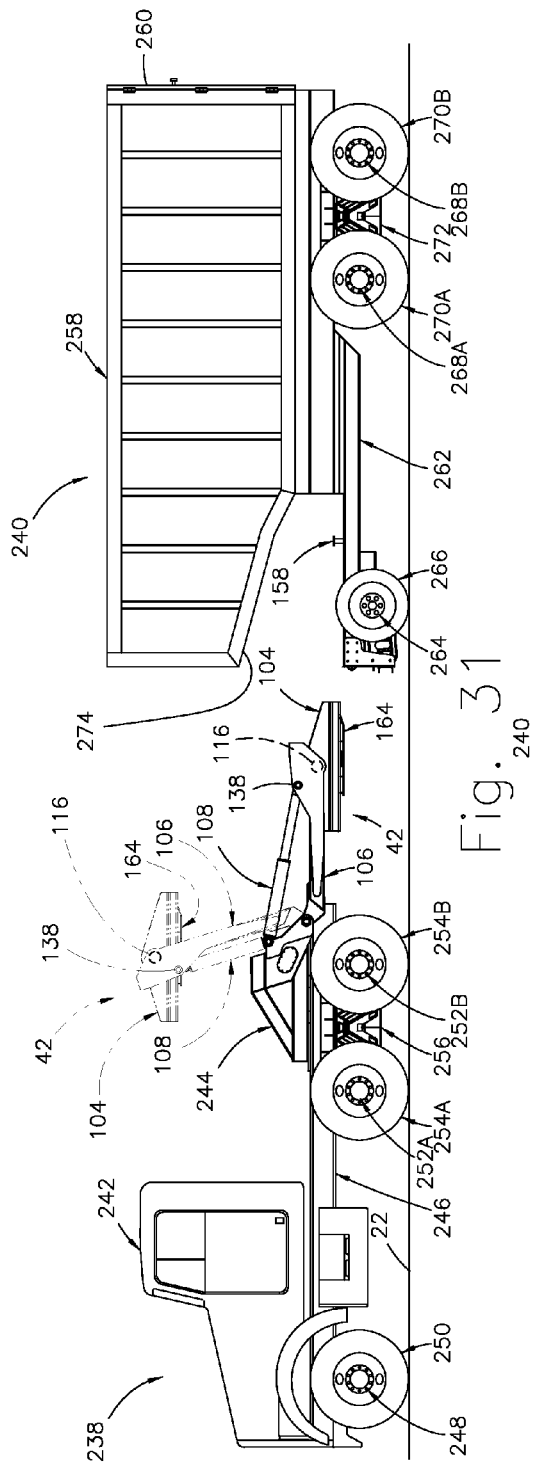
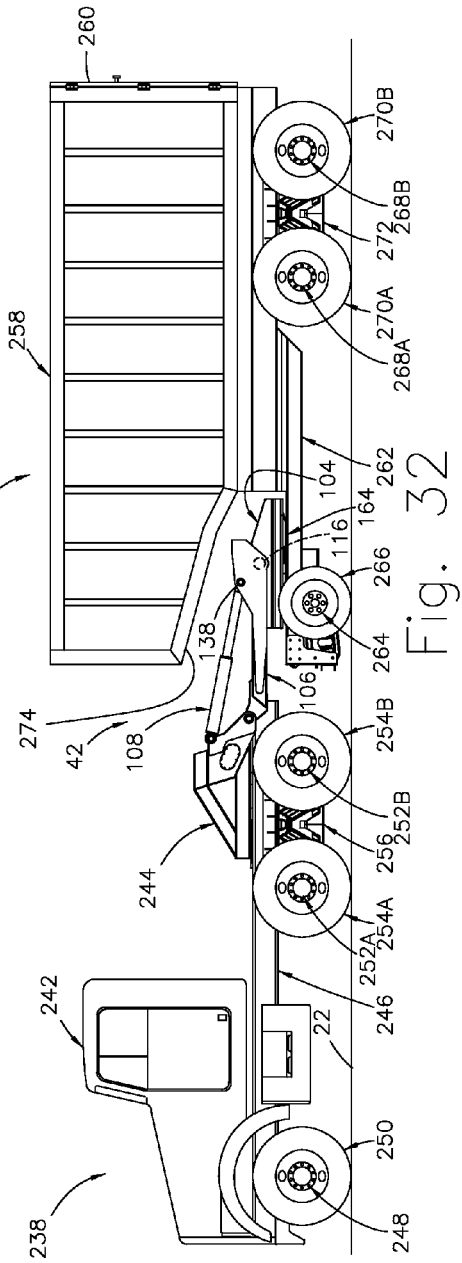

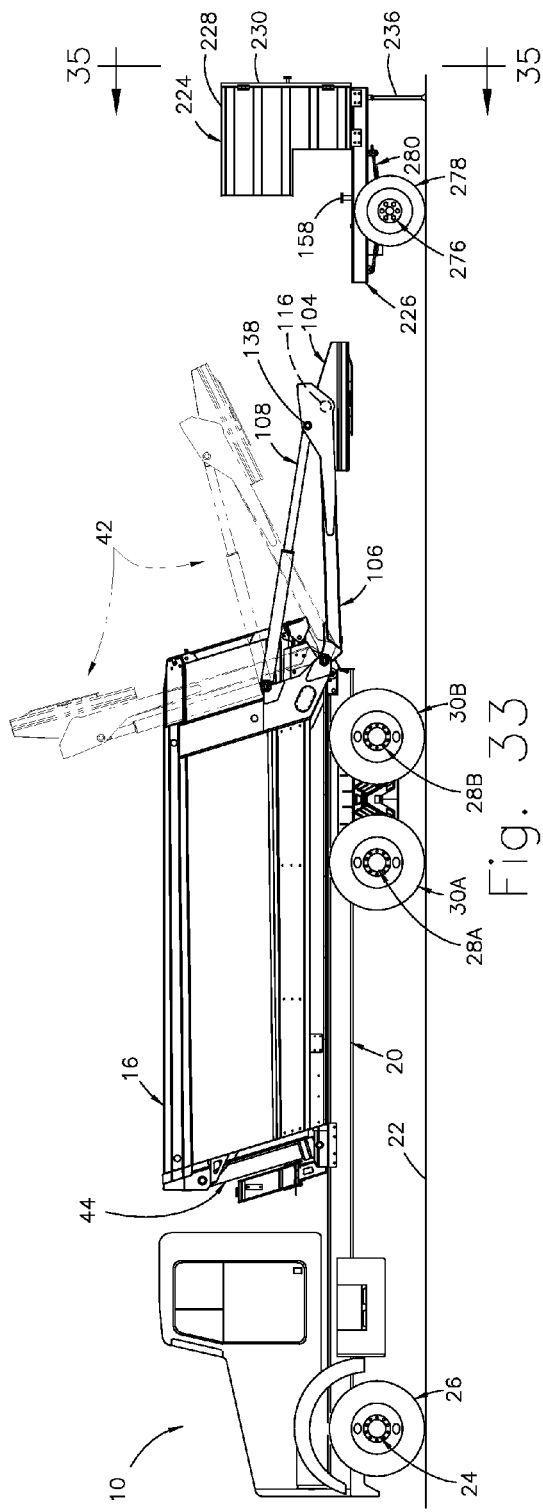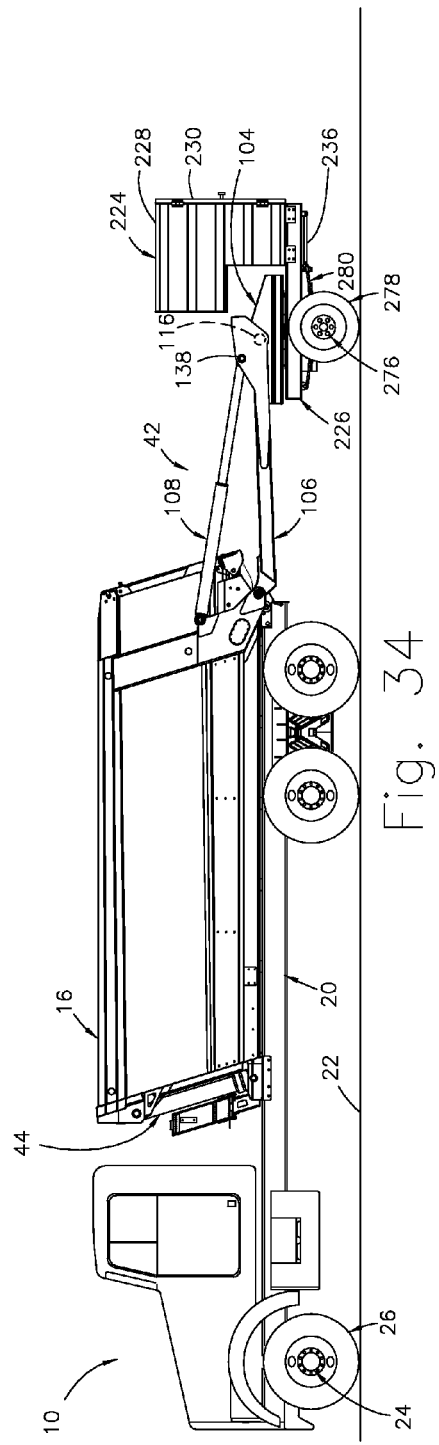

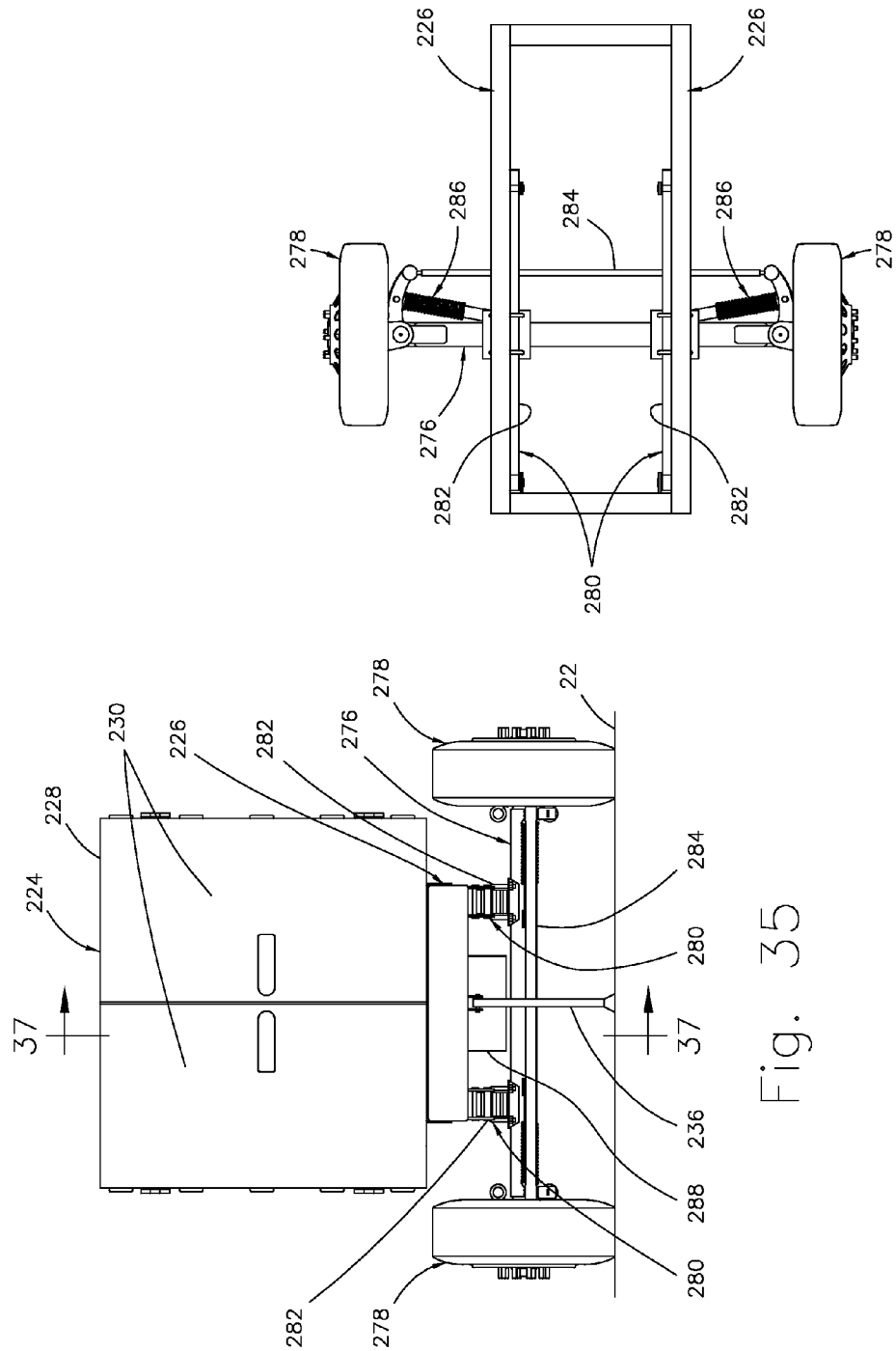

TRAILER HITCH

TECHNICAL FIELD

This invention relates to trailer hitches for hitching a trailer chassis to a motor vehicle chassis and more particularly to also having the trailer chassis help support the motor vehicle chassis and is related to U.S. patent application Ser. No. 14/803,038 entitled "DUAL TRAILING AXLE SUSPENSION SYSTEM", U.S. patent application Ser. No.14, 803,045 entitled "AUTOMATIC AUXILIARY AXLE CONTROL SYSTEM", and U.S. patent application Ser. No. 14/803,048 entitled"AXLE LOAD MONITORING SYSTEM".

BACKGROUND OF THE INVENTION

Motor vehicles such as dump trucks, tractor trailer trucks, refuse trucks, transit concrete mixing trucks, open-bed trucks, utility trucks, military trucks, and other vehicles of various types to which a significant load may be added for transport are limited in their load transporting ability by various factors. Such as the weight bearing capacity of their supporting axles and applicable federal and state laws. With such laws for example limiting the gross vehicle weight to 80,000 pounds, the weight carried by a single axle to 20,000 pounds and there being an exception as to consecutive axles that limits them to carrying a prescribed combined weight depending on their number and spacing. For example, the combined axle carrying weight is limited to 34,000 pounds in regard to the two powered tandem axles that are typically employed with heavy duty load-transporting motor vehicles. And with such factors as a result impacting the use of such motor vehicles in that the more weight the vehicle can transport at a time, the more useful the vehicle can be provided other factors that impact the ability of the vehicle to perform in an acceptable manner are also taken into account. With such factors including the axle manufacturers rated load capacity.

And in regard to such vehicles wherein it is desired to increase their load carrying capacity, it is common practice to add one or more auxiliary axles to the motor vehicle that are deployed on command to help support the motor vehicle and thereby reduce the weight carried by the axles that normally support the vehicle. Wherein the axles that normally support the vehicle are referred to as primary axles and include at least one axle with steerable wheels and one or more powered axles.

Whereas the auxiliary axles are referred to as either a pusher axle, tag axle or trailing axle in distinguishing between them in how they are employed and help to support the vehicle. Wherein a pusher axle is permanently suspended from the motor vehicle chassis in a location to operate between a forwardly-located primary axle with steerable wheels and one or more rearwardly-located primary axles with powered wheels. A tag axle is permanently suspended from the motor vehicle chassis to operate rearward of one or more primary axles with powered wheels but not normally beyond the rear end of the frame. While a trailing axle (that has also been referred to as a tag axle and trailing tag axle) is also permanently suspended from the motor vehicle chassis but in a manner to operate at a substantial distance rearward the chassis.

On the other hand, the chassis of a trailer when hitched to a motor vehicle chassis does not normally contribute with its one or more axles in helping to support the motor vehicle chassis. And instead, the trailer chassis with or without an added load may depend on the motor vehicle chassis for support in maintaining an upright stance.

SUMMARY OF THE INVENTION

The present invention resides in a trailer hitch for hitching a trailer to a motor vehicle wherein the motor vehicle has a chassis that is supported by axles suspended from the motor vehicle chassis and the trailer has a chassis that is supported by one or more axles suspended from the trailer chassis. And the trailer hitch is adapted to hitch the trailer chassis to the motor vehicle chassis and also cause the trailer chassis to help support the motor vehicle chassis to a variable degree via the trailer hitch and in a manner determined by the spring action provided by the trailer axle suspension system(s). Wherein the trailer hitch in causing the trailer chassis to help support the motor vehicle chassis to a variable degree provides a force resisting upward trailer chassis movement where the trailer axle spring action is variable and a force forcing downward trailer chassis movement where the trailer axle spring action is set. Moreover, the trailer hitch is adapted to prevent a hitched trailer chassis from turning relative to the motor vehicle as well as allow such turning. And the trailer hitch is also adapted to stow a hitched trailer chassis on the motor vehicle.

These and other features of the invention are disclosed in the accompanying drawings and description of exemplary embodiments.

DESCRIPTION OF THE DRAWINGS

FIG. 1 is a side view of a dump truck and a trailer having a dump body wherein the trailer is shown hitched to the dump truck by a trailer hitch according to the present invention.

FIG. 2 is a perspective view of the above dump truck and trailer wherein the dump truck is only partially shown.

FIG. 3 is another perspective view of the above dump truck and trailer wherein the dump truck is only partially shown.

FIG. 4 is an overhead view of the above dump truck and trailer wherein the front wheels of the dump truck and all of the trailer wheels are shown with phantom lines when the dump truck while traveling forward is executing a turn directed by its front wheels.

FIG. 5 is an overhead view like FIG. 4 wherein the front wheels of the dump truck and the trailer are shown with phantom lines when the dump truck while traveling backward is executing a turn directed by its front wheels.

FIG. 8 is a top-side perspective view of the trailer chassis in the above figures.

FIG. 9 is a bottom-side perspective view of the trailer chassis in the above figures.

FIG. 10 is an overhead view of the trailer hitch and the trailer chassis in the above figures.

FIG. 15 is a side view of the dump truck and trailer chassis in the above figures wherein the trailer chassis is shown unhitched from the dump truck and the suspended portion of the trailer hitch is shown in a stowed condition on the dump truck.

FIG. 16 is a side view like FIG. 15 but showing the dump body of the dump truck tilted with its tailgate open to provide for dumping a load.

FIG. 17 is a perspective view showing the suspended portion of the trailer hitch in the process of being lowered from its stowed condition in FIG. 15 on the dump truck to provide for hitching the trailer chassis in the above figures and without its dump body to the dump body of the dump truck and thereby to the dump truck chassis.

FIG. 18 is a side view showing the trailer chassis in the above figures and without its dump body hitched to the dump truck chassis by the trailer hitch and in the process of also being stowed by the trailer hitch on the dump truck.

FIG. 19 is a view like FIG. 18 but showing the completion of the stowing of the trailer chassis on the dump truck with the trailer hitch.

FIGS. 25-28 are side views of the dump truck and trailer in the above figures while traveling on various road surfaces.

FIG. 29 is a side view of the dump truck and a different trailer with only one supporting axle prior being hitched to the dump truck with the trailer hitch according to the present invention.

FIG. 30 is a view like FIG. 29 but showing the trailer hitched to the dump truck.

FIG. 31 is a side view of a tow truck and a trailer prior to the trailer being hitched to the tow truck by the trailer hitch according to the present invention.

FIG. 32 is a view like FIG. 31 but showing the trailer hitched to the tow truck.

FIG. 33 is a side view of the dump truck and a trailer like that in FIG. 29 but with a different trailer axle and trailer axle suspension system and prior to being hitched to the dump truck with the trailer hitch according to the present invention.

FIG. 34 is a view like FIG. 33 but showing the trailer hitched to the dump truck.

FIG. 35 is a view taken along the lines 35-35 in FIG. 33 when looking in the direction of the arrows showing the trailer axle and its suspension system.

FIG. 36 is an overhead view with the load container and some trailer chassis components removed exposing the trailer axle and its suspension system in FIGS. 33-35.

DESCRIPTION OF EXEMPLARY EMBODIMENTS

Figure 6:
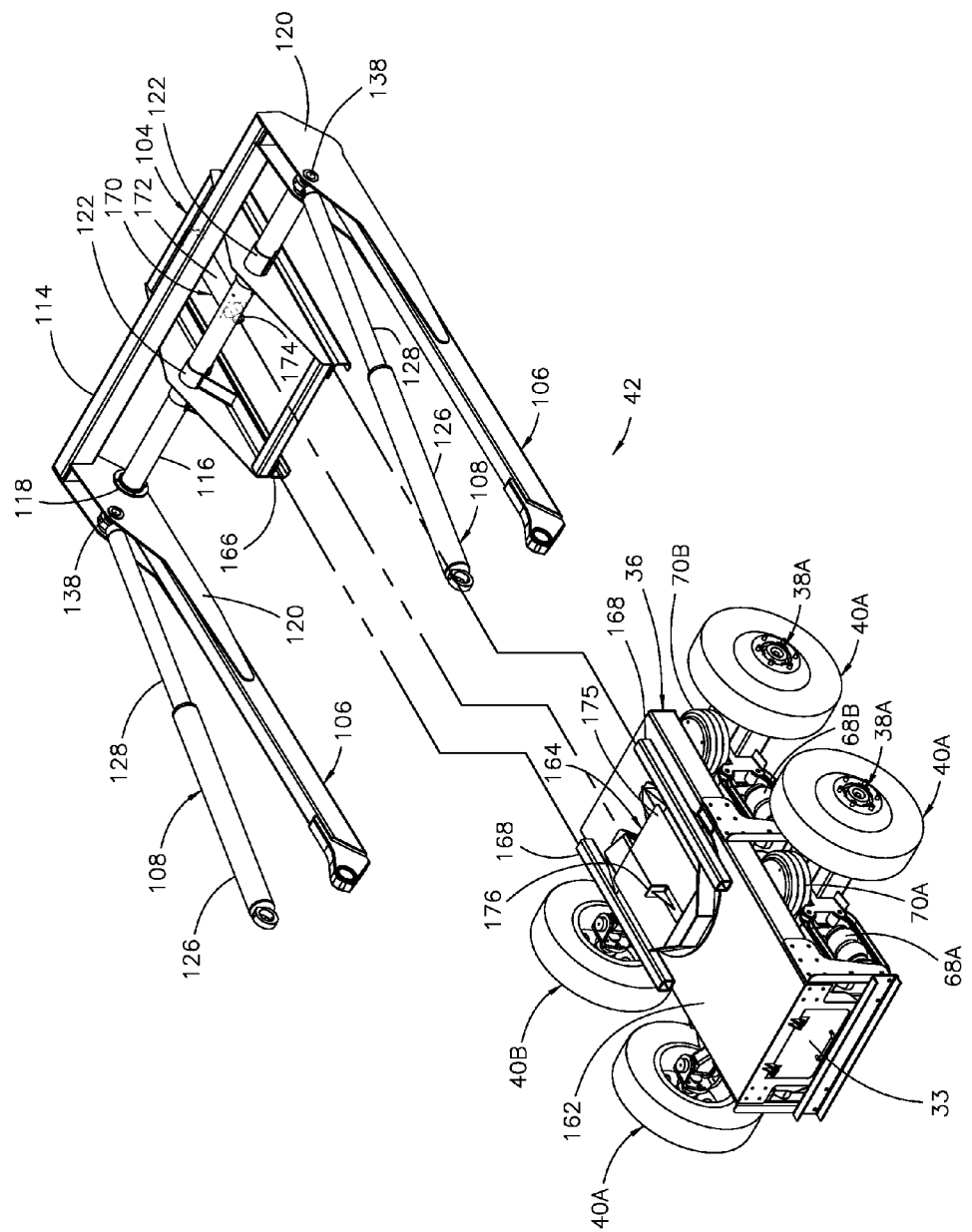
FIG. 6 is an exploded top-side perspective view of certain portions of the trailer hitch and with a part removed to provide for interior viewing.
Figure 7:
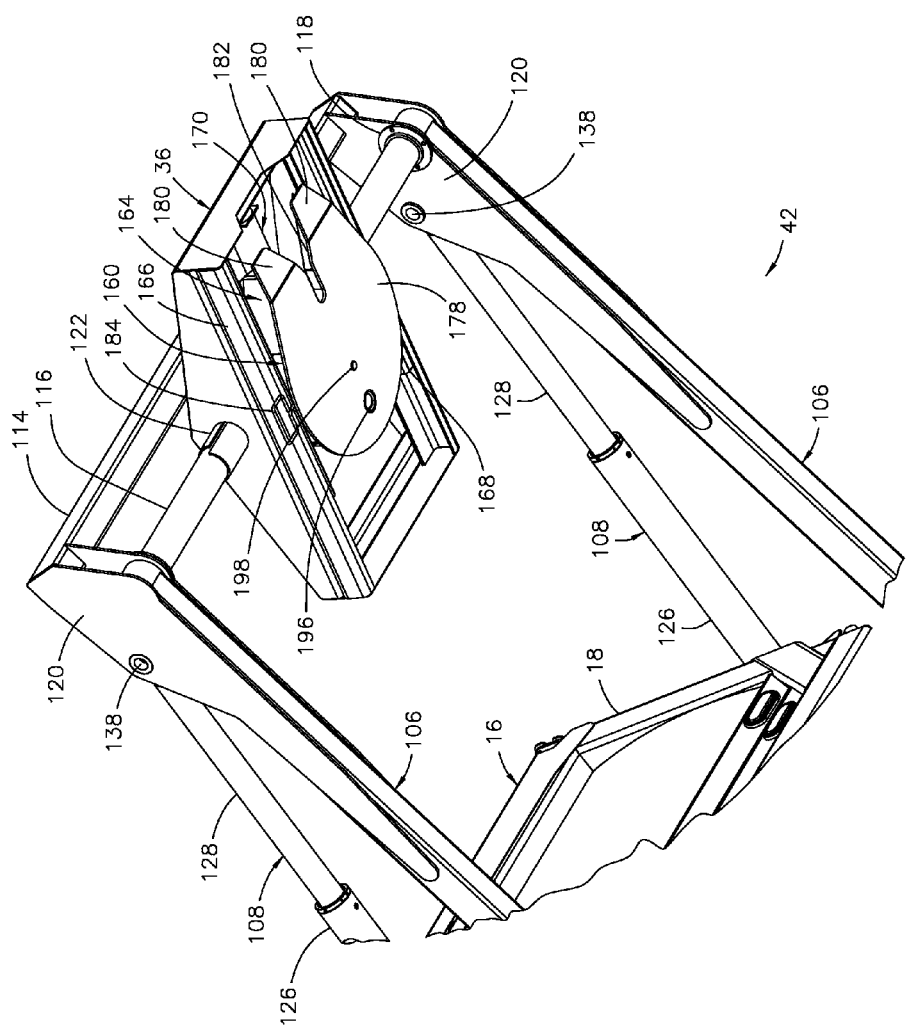
FIG. 7 is a bottom-side perspective view of certain portions of the trailer hitch.

Referring to FIGS. 1-28, the present invention is shown as applied to a motor vehicle 10 and a trailer 12 that is hauled by the motor vehicle and the trailer has more than one supporting axle having a suspension system that includes air springs supplied with a controllable air pressure. With the motor vehicle being in the form of a dump truck having a cab 14 that serves as a vehicle operator and passenger compartment and a load container in the form of a tiltable dump body 16 that has a latchable top-hinged tail gate 18. Wherein the cab 14 and dump body 16 are supported by a chassis 20 in a conventional manner and the truck chassis is supported on a road surface 22 by primary axles comprising a forwardly-located front axle 24 with steerable wheels 26 at its outboard ends under the control of the vehicle operator and rearwardly-located powered tandem axles 28A and 28B with dual wheels 30A and 30B respectively at their outboard ends. And wherein the trailer 12 has a storage compartment 32 with a latchable top-hinged door 33 and a load container in the form of a readily detachable dump body 34 with a latchable top-hinged tail gate 35. And wherein the storage compartment 32 and the trailer dump body 34 are supported by a chassis 36 that is supported on the road surface by a pair of axles 38A and 38B with wheels 40A and 40B respectively at their outboard ends. And wherein the trailer chassis 36 is hitched to the truck chassis 20 by a trailer hitch 42 according to the present invention that is adapted to also cause the trailer chassis to help support the truck chassis to a variable degree by acting on the trailer chassis in a manner determined by whether the spring action provided by the trailer axle suspension systems are variable or set as further described later.

In further regard to the dump bodies and the trailer storage compartment 32, the truck dump body 16 has a level floor and is tilted by a hydraulically-operated tilting mechanism 44 of a conventional type that is mounted between the frame 45 of the truck chassis 20 and the dump body 16 at the forward end of the latter. Whereas the trailer dump body 34 has a floor 46 that is angled downward in the rearward direction and the trailer dump body is fastened to the frame 47 of the trailer chassis 36 in a readily detachable manner with a support member 48 at the rear end of the trailer dump body and trailer chassis and with a pair of laterally-spaced support members 50 at the front end of the trailer dump body and trailer chassis. Whereby the floor 46 of the trailer dump body is located above the frame of the trailer chassis 36 to provide accommodating space there between for the trailer hitch 42 as further described later. Whereas the trailer storage compartment 32 with its access door 33 is integrated into the forward end of the trailer chassis 36 and forms a permanent lower portion thereof and also structurally reinforces the trailer frame 47. See FIGS. 6, 8 and 9.

Describing now the primary axle arrangement, the truck's front axle 24 and powered tandem axles 28A and 28B are suspended in parallel relationship from laterally spaced locations from the frame 45 of the truck chassis 20. With the front axle 24 located under a forward end-portion of the truck chassis 20 and the powered tandem axles 28A and 28B located under a rear end-portion of the truck chassis 20 and dump body 16. And with the tandem axles 28A and 28B and thus their wheels 30A and 30B powered by a power train (not shown) of a suitable conventional type including an engine and transmission that are controlled from the cab by the vehicle operator. And wherein the suspension systems suspending these axles from the truck chassis 20 are of a suitable conventional type with the suspension system 52 for the powered tandem axles 28A and 28B in this exemplary embodiment being of the walking-beam type.

Turning now to the trailer axles 38A and 38B, they are suspended in parallel relationship at laterally-spaced locations from the frame 47 of the trailer chassis 36 by matching suspension systems 54A and 54B respectively. See FIGS. 8-10. And the trailer axle wheels 40A and 40B are mounted on the ends of the trailer axles 38A and 38B with steering knuckles 56A and 56B respectively that establish the wheels with a suitable positive caster angle and have steering arms 58A and 58B that are connected by tie rods 60A and 60B respectively that provide the trailer wheels with a suitable toe-in and with the thus interconnected trailer wheels stabilized and returned to a normal/neutral condition following forced steerage by the turning movement of the truck chassis 20 by coil spring/shock absorber assemblies 61A and 61B like that in U.S. Pat. No. 7,775,308 that are connected between the steering arms 58A and 58B and the axles 38A and 38B respectively. Whereby the trailer axle wheels 40A and 40B are enabled to align with truck movement as shown in solid lines in FIGS. 4 and 5 and also self-steer in reaction to steered turning movement of the truck as shown in phantom lines in these views and depending on whether the truck is traveling forwardly or backwardly and whether the trailer chassis 36 is allowed by the trailer hitch 42 to turn or not as further described later.

Continuing on with the separate trailer axle suspension systems 54A and 54B, they each comprise a pair of parallel arms 62A and 62B of equal length that are pivotally connected at one end by pivot pins 64A and 64B to the trailer chassis 36 and pivotally connected at the other end by pivot pins 66A and 66B to the respective trailer axles 38A and 38B inboard of the steering knuckle at this end of the axles. And for operation of the thus suspended trailer axles 38A and 38B, there is provided a matching pair of pneumatically-operated actuators 68A and 68B of the elastomeric bag type and a matching pair of air springs 70A and 70B respectively that are also of the elastomeric bag type. Wherein the actuators 68A and 68B are pivotally connected at one end to the trailer chassis 36 with the lower pivot pins 64A and 64B inward of and adjacent the pivotal connection of the lower suspension arms 62A and 62B respectively with the trailer chassis and are pivotally connected at their other end to the trailer axles 38A and 38B with the upper pivot pins 66A and 66B inward of and adjacent the pivotal connection of the upper suspension arms 62A and 62B respectively with the respective trailer axles. Whereby the actuators 68A and 68B act in an angular manner between the trailer chassis 36 and the trailer axles 38A and 38B during axle movement. Whereas the air springs 70A and 70B are mounted to act in a substantially upright manner between the respective trailer axles 38A and 38B and the trailer chassis 36 during axle movement. And the actuators 68A and 68B when supplied with a controllable air pressure while the air springs 70A and 70B are exhausted of air pressure raise and thereby stow the trailer axles 38A and 38B with respect to the trailer chassis 36 as shown in solid lines in FIG. 22 and further described later. And the air springs 70A and 70B when supplied with a controllable air pressure while the actuators 68A and 68B are exhausted of air pressure deploy the trailer axles 38A and 38B outward from the trailer chassis 36 as shown in solid lines in FIG. 22 and also further described later.

Figure 11:
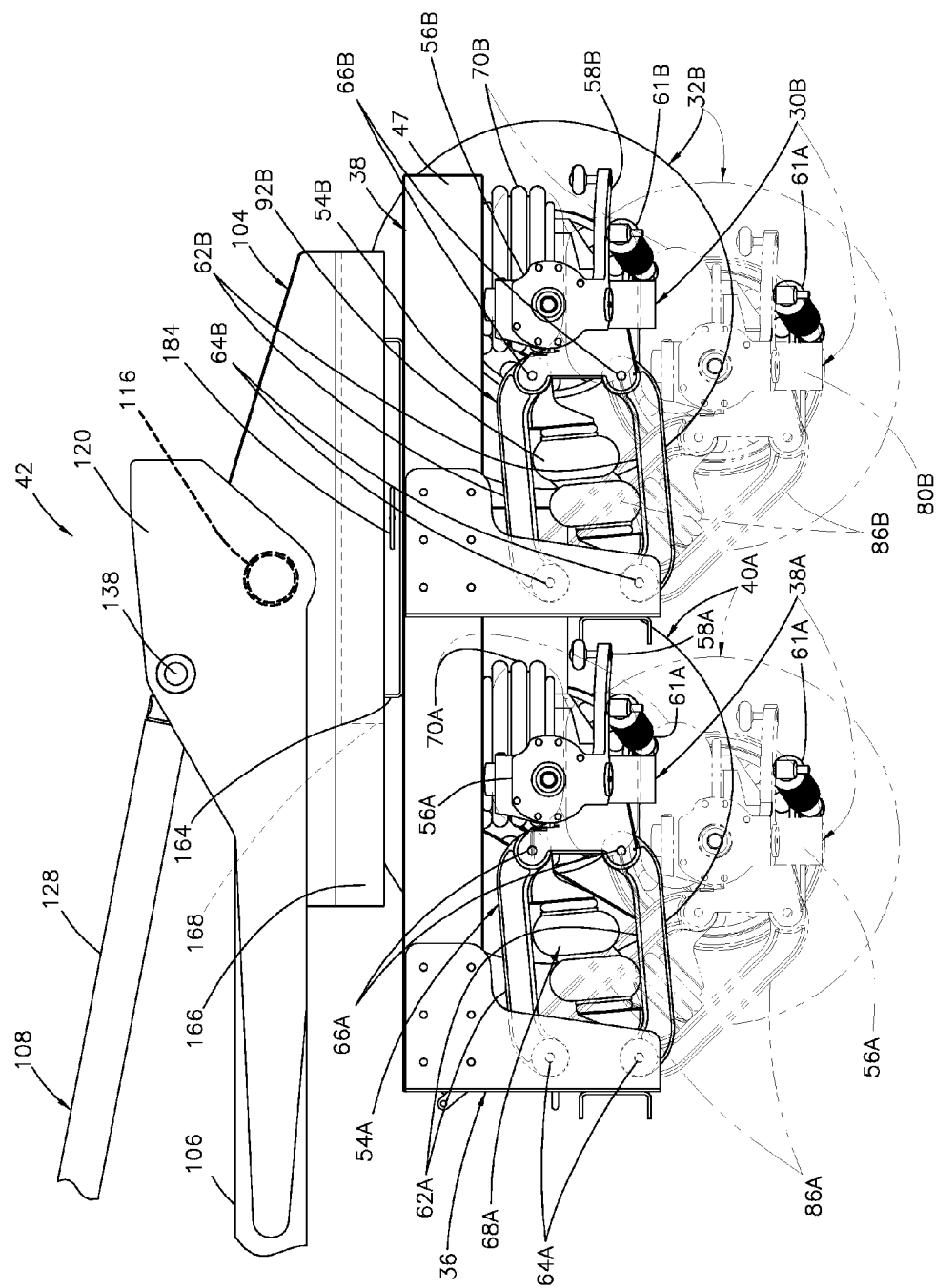
FIG. 11 is a view taking along the lines 11-11 in FIG. 10 when looking in the direction of the arrows and with certain near-side components absent to provide for interior viewing.
Figure 12:
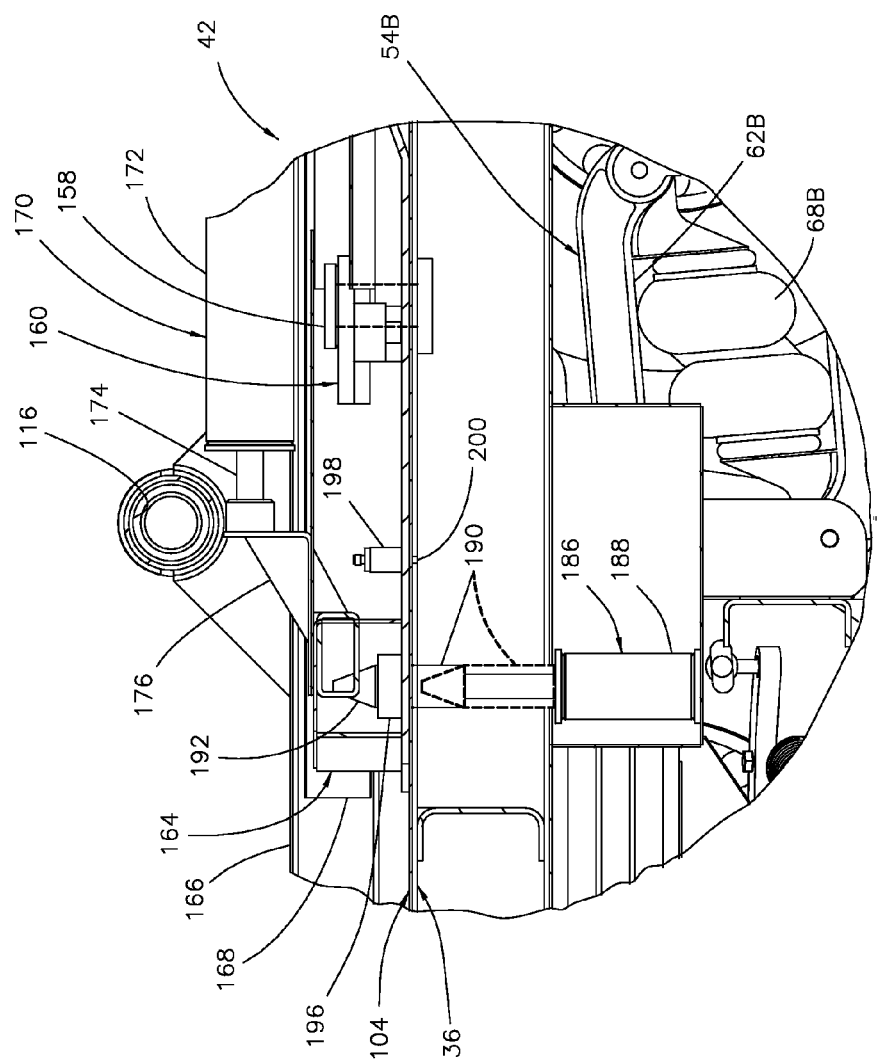
FIG. 12 is a view taken along the lines 12-12 in FIG. 10 when looking in the direction of the arrows and with certain near-side components absent to provide for interior viewing.
Figure 13:
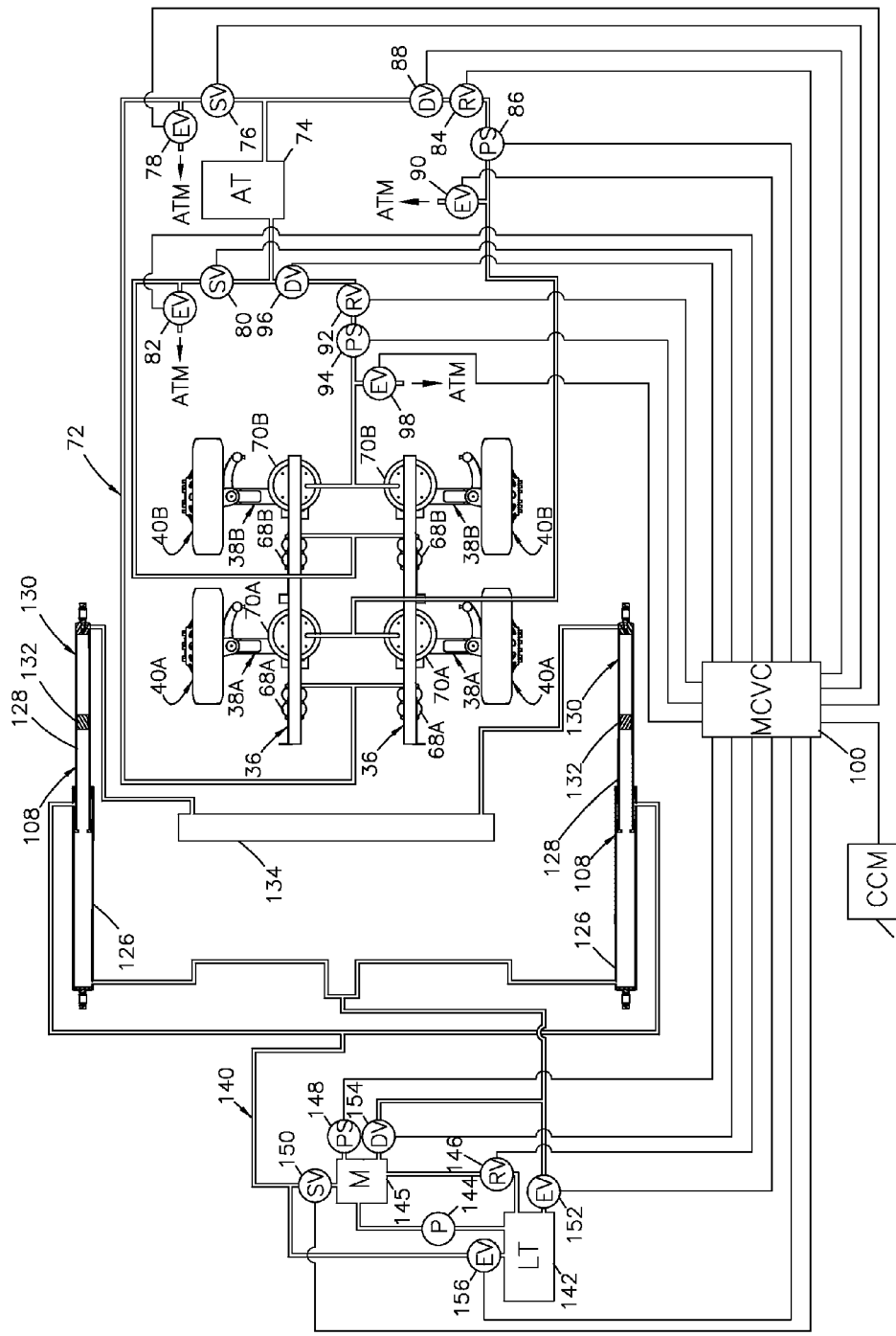
FIG. 13 is a schematic of the control system that controls the operation of the trailer hitch in so far as certain functions are provided.

Referring to FIG. 13, the operation of the actuators 68A, 68B and air springs 70A, 70B is provided by a pneumatic circuit 72 comprising an air tank (AT) 74 that is supplied with air on demand by an engine-driven air compressor (not shown) and with the air in the tank maintained at a pressure suited to accommodate the actuators 68A and 68B, the air springs 70A and 70B and other pneumatically-powered devices on the truck. And for the actuators 68A there is a separate control circuit comprising an axle stowing/raising valve (SV) 76 and exhaust valve (EV) 78 that provide for pressurizing the actuators 68A with tank pressure on opening of the stowing/raising valve (SV) 76 and closing the exhaust valve (EV) 78 and thereby raising the trailer axle 38A to its stowed position with respect to the trailer chassis 36 as shown in solid lines in FIG. 11 provided the air springs 70A are not pressurized. With the exhaust valve (EV) 78 providing for exhausting the actuators 68A to the atmosphere (ATM) with the opening of this valve and closure of the stowing/raising valve (SV) 76 to allow unimpeded action by the air springs 70A when they are pressurized. And for the actuators 68B, there is a separate control circuit comprising an axle stowing/raising valve (SV) 80 and exhaust valve (EV) 82 that provide for pressurizing the actuators 68B with tank pressure on opening of the stowing/raising valve (SV) 80 and closing the exhaust valve (EV) 82 and thereby raising the trailer axle 38B to its stowed position with respect to the trailer chassis 36 as shown in solid lines in FIG. 11 provided the air springs 70B are not pressurized. With the exhaust valve (EV) 82 providing for exhausting the actuators 68B to the atmosphere (ATM) with the opening of this valve and closure of the stowing/raising valve (SV) 80 to allow unimpeded action of the air springs 70B when they are pressurized.

Whereas for the operation of the air springs 70A, there is provided a separate control circuit comprising a pressure-regulator valve (RV) 84 for regulating the air pressure to pressurize the air springs 70A, a pressure sensor (PS) 86 that provides feedback for controlling the operation of the regulator valve 84 in providing the desired pressure for the functioning of the air springs 70A and indication of the pressure presently acting in these air springs, an axle-deploying/lowering valve (DV) 88 and associated exhaust valve (EV) 90 that provide for pressurizing the air springs 70A on opening the deploying/lowering valve (DV) 88 and closing the exhaust valve (EV) 90 and thereby deploying the trailer axle 38A with respect to the trailer chassis 36 as shown in phantom lines in FIG. 11 using the pressure determined by the regulator valve 84. With the exhaust valve (EV) 90 also providing for exhausting the air springs 70A to the atmosphere (ATM) with the opening of this valve and closure of the deploying valve (DV) 88 to allow the actuators 68A when pressurized to forcibly raise the trailer axle 38A to its stowed position with respect to the trailer chassis 36 as shown in solid lines in FIG. 11. And for the operation of the air springs 70B, there is a separate control circuit comprising a pressure-regulator valve (RV) 92 for regulating the air pressure to operate the air springs 70B, a pressure sensor (PS) 94 that provides feedback for controlling the operation of the regulator valve 92 in providing the desired pressure for the functioning of the air springs 70B and indication of the pressure presenting acting in these air springs, and an axle-deploying/lowering valve (DV) 96 and associated exhaust valve (EV) 98 that provide for lowering the trailer axle 38B with the air springs 70B to a deployed position with respect to the trailer chassis 36 as shown in phantom lines in FIG. 11 on opening the deploying valve (DV) 96 and closing the exhaust valve (EV) 98. With the exhaust valve (EV) 98 also providing for exhausting the air springs 70B to the atmosphere (ATM) with opening of this valve and closure of the deploying valve (DV) 96 to allow the actuators 68B when pressurized to forcibly raise the trailer axle 38B to its stowed position with respect to the trailer chassis 36 as shown in solid lines in FIG. 11.

The valves in the pneumatic circuit 72 are of a conventional electrically-operated type and connected to a master control valve center (MCVC) 100 that is adapted to operate the valves under the command of the vehicle operator via a central command module (CCM) 102 located in the cab 14. And with the regulator valves (RV) 84 and (RV) 92 being operable to regulate the air pressure supplied to the respective air springs 70A and 70B in accordance with controlled voltage input.

Turning now to the trailer hitch 42, it comprises a carriage 104 that is latchable to the trailer chassis 36, a pair of interconnected suspension arms 106 that suspend the carriage 104 from the truck chassis 20 via the truck dump body 16, and a pair of hydraulically-operated actuators 108 that operate between the suspension arms 106 and the truck chassis 20 also via the truck dump body. Wherein the hydraulically-operated actuators 108 condition the trailer hitch for both hitching operation and stowing purposes as further described later and provide a force acting on the trailer chassis 36 resisting upward trailer chassis movement while hitched to the truck chassis enabling the air springs 70A and 70B with a variable pressure to force the trailer axles 38A and 38B and thereby the trailer chassis to help support the truck chassis to a variable degree via the trailer hitch 42 as well as continue to provide support of the trailer chassis as further described later.

In carrying out the above trailer hitch functions, the suspension arms 106 and hydraulically-operated actuators 108 are located to clear the truck dump body 16 without interference while being connected with the dump body 16 and thereby with the truck chassis 20 in a reinforced manner by suspension support members 110 that are fixed to the outboard sides of a rear end-portion of the truck dump body. And wherein the suspension arms 106 are pivotally connected at one end by a pivot pin 112 to a lower end portion of the respective support members 110 for swinging about an axis parallel to the primary axles 24, 28A and 28B, are rigidly joined together at their other end by a cross-member 114, and are pivotally connected adjacent the cross-member with an end portion of a laterally-extending tubular shaft 116 by which the carriage 104 is pivotally supported by the suspension arms 106. With such pivotal support being provided by the ends of the shaft 116 being supported with flange bearings 118 that are mounted in a reinforced U-shaped channel portion 120 of the suspension arms 106. See FIGS. 6, 7, and 10.

Completing the pivotal support of the carriage 104 with the suspension arms 106, the tubular shaft 116 is received along a mid-portion thereof by a pair of reinforcing tubular sleeves 122 that are welded to the shaft 116 and to bracing structure of the carriage to thereby provide for rigid support of the shaft 116 on the carriage. See FIGS. 6 and 7 with a top part 124 of the carriage 104 removed to expose the interior. And wherein the shaft 116 is located on the carriage 104 parallel to the axis about which the suspension arms 106 can swing and thereby parallel with the primary axles 24, 28A and 28B in providing for swinging movement of the carriage with respect to the suspension arms as further described later.

Turning now to the hydraulically-operated actuators 108, they are like those in U.S. Pat. No. 7,775,308 wherein they comprise a cylinder 126 and piston 128 and incorporate a gas spring 130. With the gas springs 130 each comprising a piston 132 that is slidably received in the associated actuator piston 128 and is acted on at one end by the hydraulic pressure acting on the actuator piston and is acted on at the other end by gas pressure at a prescribed charge pressure that is made available in adequate supply to both gas springs 130 by a gas pressure accumulator tank 134. See FIG. 13. And with the gas preferably being nitrogen for system compatibility and the charge pressure determined for the intended gas spring operation described later.

Continuing on with the employment of the hydraulically-operated actuators 108, their cylinders 126 are pivotally connected at their closed end by a pivot pin 136 to the respective suspension support members 110 at a location above the respective pivotal connections of the suspension arms 106 with these support members. And the actuator pistons 128 are pivotally connected at their operating end within and to the channel portion 120 of the suspension arms 106 by a pivot pin 138 at a relatively short distance from where the suspension arms are pivotally connected with the shaft 116 that is fixed to the carriage 104. Whereby the carriage 104 is located and maintained by the hydraulic actuators 108 in a trussing manner while the trailer chassis 36 is hitched to the truck chassis 20 with the trailer hitch 42. Moreover, the carriage-mounted trailer chassis supporting shaft 116 that is acted on by the hydraulically-operated actuators 108 via the suspension arms 106 while the trailer axles 38A and 38B and thereby the trailer chassis 36 is forced by the air springs 70A and 70B to help support the truck chassis 20 as further described later is located above and substantially midway between the trailer axles 38A and 38B throughout their range of movement relative to the trailer chassis 36.

Referring to FIG. 13, the operation of the hydraulically-operated actuators 108 is provided by a hydraulic circuit 140 comprising a vented liquid tank (LT) 142 containing hydraulic fluid, a hydraulic pump (P) 144 that is supplied with the hydraulic fluid in the tank 142 and operates on demand to deliver the hydraulic fluid to a manifold (M) 145, a controllable hydraulic pressure regulator valve (RV) 146 that returns excess fluid at the manifold to the tank 142 in regulating the pressure being supplied from the manifold for actuator operation, a pressure sensor (PS) 148 that provides feedback for controlling the operation of the regulator valve in providing the desired operating pressure for the actuators 108 and indicating the present pressure, a trailer hitch stowing valve (SV) 150 and exhaust valve (EV) 152 providing for actuator retraction, and a trailer hitch deploying valve (DV) 154 and exhaust valve (EV) 156 providing for actuator extension. And wherein the valves in the hydraulic circuit 140 are of a conventional electrically-operated type with the pressure regulator valve 146 being operable to vary the hydraulic pressure supplied to the actuators 108 in accordance with a controlled voltage input. And wherein the components in the hydraulic circuit 140 are controlled with the master control valve center (MCVC) 100 that is under the command of the central command module (CCM) 102 at the direction of the vehicle operator.

Figure 20:
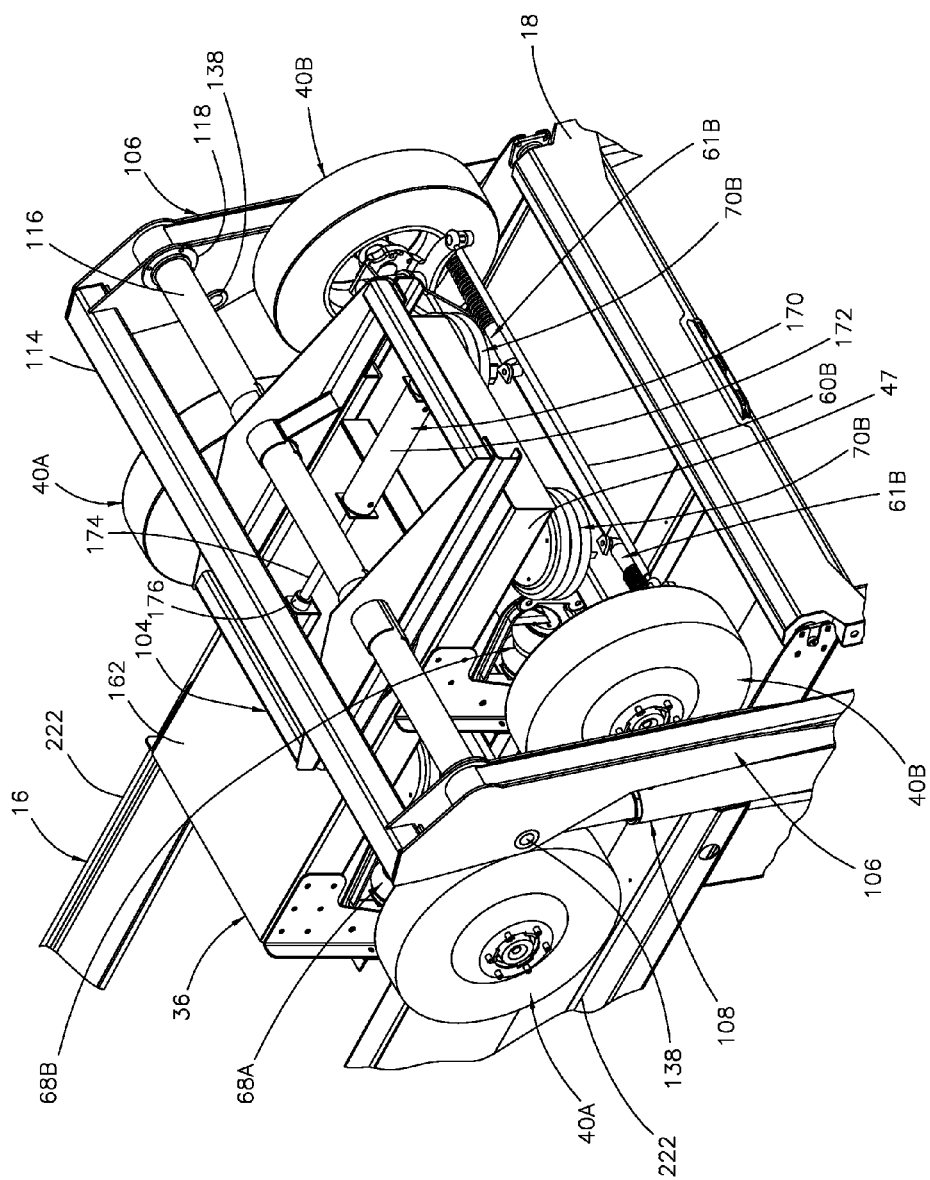
FIG. 20 is a perspective view showing the trailer hitch and the trailer chassis in the above figures at the completion of their stowing on the dump truck.

Continuing on with the trailer hitch 42 components, there is employed a 5th-wheel type of trailer hitch arrangement comprising a conventional latchable pivot pin 158 commonly referred to as a king pin and a conventional latching mechanism 160 that latches to the king pin. And in employing such in the trailer hitch 42, the king pin 158 is fixed to the flat top side 162 of the trailer chassis 36 at a location between the trailer axles 38A and 38B and closer to the rear trailer axle 38B for trailer steerage purposes when the trailer chassis is allowed to pivot about the king pin as further described later. And the latching mechanism 160 is incorporated in a hitching module 164 that for clearance purposes is slidably guided, retained and positioned on the bottom side of the carriage 104 for clearance purposes as further described later. With such guided retention of the hitching module 164 by the carriage 104 provided by a pair of straight laterally-spaced parallel guide rails 166 of U-channel shape that are rigidly fixed to the bottom side of the carriage and slidably receive straight parallel guide members 168 of square tubular shape that are rigidly fixed to longitudinally extending parallel sides of the hitching module. See FIGS. 6, 7 and 20. And with the hitching module 164 positioned under the carriage 104 by a pneumatically-operated actuator 170 comprising a cylinder 172 with a piston-operated rod 174 as shown in FIGS. 6 and 20 with the top part 124 of the carriage removed. Wherein the cylinder 172 is fixed to the carriage 104 and the piston rod 174 is connected with a bracket 176 to the flat top 175 of the hitching module 164. And the hitching module actuator 170 is operated by the MCVC 100 under the command of the vehicle operator with the CCM 102 as further described later.

In providing for coupling the hitching module 164 to the king pin 158, the latching mechanism 160 has a generally horseshoe shape on its bottom side defined by a flat surface 178, ramps 180 that lead to this flat surface and a guide channel 182. Whereby on backing and maneuvering the dump truck 10 toward the trailer chassis 36 with the hitching module 164 positioned at a suitable height by the actuators 108 and the trailer dump body support members 50 temporarily removed, the hitching module 164 can be positioned so that the flat surface 178 is located to slidably engage with the flat top 162 of the trailer chassis with continued truck movement while the channel 182 at its entrance receives and guides the king pin 158 into aligned engagement with the latching mechanism 160 that is spring loaded to then grasp and effect locked engagement therewith and thereby effect the hitching of the trailer chassis 36 to the truck chassis 20. And wherein the carriage-mounted hitching module supporting shaft 138 that is acted on by the hydraulically-operated actuators 44 is always located above and between the trailer axles 28A and 28B throughout their range of movement relative to the trailer chassis 36 and thus with the trailer axles always located at opposite sides of the shaft 138 and the shaft 116 by which the trailer chassis is connected with the suspension arms 106.

And the latching mechanism 160 on locking to the king pin 158 maintains flat surface-to-surface engagement between the hitching module 164 and the trailer chassis 36 at all times including turning of the trailer chassis 36 relative to the truck chassis 20 about the king pin. And wherein the latching mechanism 160 is also released from its grasp of the king pin 158 in a conventional manner by manually pulling on a handle 184 connected with the latching mechanism 160 to thereby allow the trailer chassis to be unhitched from the truck chassis. See FIGS. 7 and 11. Or such release can be accomplished and also in a conventional manner with a powered actuator and from the truck cab or other suitable location by the vehicle operator.

Moreover, there is provided means for selectively preventing the trailer chassis 36 from pivoting about the king pin 158 while the trailer chassis 36 is hitched to the truck chassis 20 with the latching mechanism 160. Wherein a pneumatically-operated actuator 186 comprising a cylinder 188 with a piston-rod operated locking pin 190 is fixed in an upright condition on the trailer chassis 36 directly forward of the king pin 158 with the cylinder 188 located below the top side 162 of the trailer chassis. See FIG. 12. And the locking pin 190 that has a pointed end 192 for guiding entry is extendable from a retracted position as shown in phantom lines in FIG. 12 though an aperture 194 in the top side 162 of the trailer chassis and then received as shown in solid lines in this view with a close fit in a bushing 196 that is fixed to the hitching module 164 to thereby prevent the trailer chassis 36 from pivoting about the king pin 158 while hitched to the truck chassis 20 with the latching mechanism 160. With such engaging operation of the locking pin 190 with the bushing 196 only being possible when the trailer chassis 20 is in centered alignment with the carriage 104 and hitching module 164 and thereby with the truck chassis 20.

And for obtaining the centered longitudinal alignment, the vehicle operator is provided with truck maneuvering guidance following hitching of the trailer chassis 36 to the truck chassis 20 with the latching mechanism 160 by alignment detecting means comprising a proximity switch 198 and switch operating magnet 200. See FIGS. 7, 8 and 12. Wherein the proximity switch 198 is mounted on the hitching module 164 for exposure at its sensing end to the top side 162 of the trailer chassis 36 and the switch operating magnet 200 is mounted in the top side 162 of the trailer chassis directly behind the king pin 158 and in the path of the proximity switch with pivotal movement of the hitching module 164 and carriage 104 about the king pin 158. And with the magnet 200 located so that when longitudinal alignment of the trailer chassis 36, hitching module 164, carriage 104 and truck chassis 20 occurs, the proximity switch 198 is operated by the magnet 200 and is connected as shown in FIG. 14 to send a signal to the CCM 102 indicating to the vehicle operator that the trailer hitch locking device can be engaged by the locking pin actuator 186 with the MCVC 100 to maintain the hitched trailer chassis 36 in alignment with the truck chassis 20 depending on whether the truck and hitched trailer are traveling forward or backward and the trailer-maneuvering capability desired by the vehicle operator.

Figure 14:
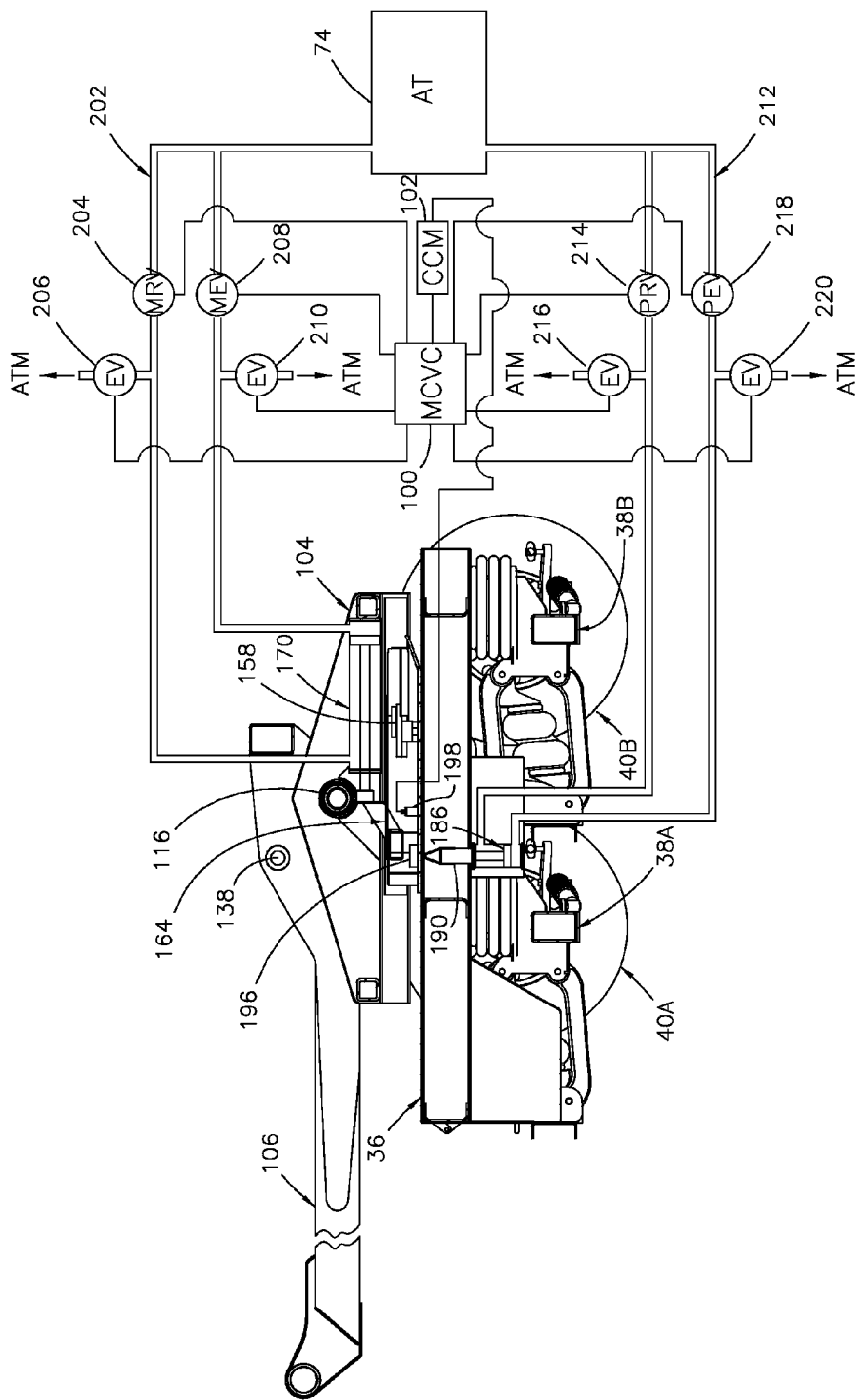
FIG. 14 is a view also taken along the lines 12-12 in FIG. 10 when looking in the directions of the arrows and with certain near-side components absent to provide for interior viewing and includes a schematic of the control system that controls the operation of the trailer hitch apart from that provided by the control circuit in FIG. 13.

Still referring to FIG. 14, the hitching module positioning actuator 170 is operated by a pneumatic circuit 202 that is supplied with regulated air pressure by the air tank (AT) 74 and comprises a module retracting valve (MRV) 204, an exhaust valve (EV) 206, a module extending valve (MEV) 208, and an exhaust valve (EV) 210. And these valves like those in the other control circuits are operated by the master control valve center (MCVC) 100 under the direction of the vehicle operator from the central command module (CCM) 102. And with the module retracting valve 204 and exhaust valve 210 opened and the module extending valve 208 and exhaust valve 206 closed by the MCVC 100 under vehicle operator control at the CCM 102, the hitching module 164 is positioned by the actuator 170 in a fully-retracted position as shown in FIG. 14 and other views and whether or not the trailer chassis 36 is then hitched to the truck chassis 20 with the trailer hitch 42. And with the module extending valve 208 and exhaust valve 206 opened and the module retracting valve 204 and exhaust valve 210 closed by the MCVC 100 under operator control at the CCM 102, the hitching module 164 is positioned by the actuator 170 in a fully-extended position as shown in FIG. 19 and other views and whether or not the trailer chassis 36 is then hitched to the truck chassis 20 with the trailer hitch 42.

And still referring to FIG. 14, the locking pin actuator 186 is operated by a pneumatic circuit 212 that is supplied with regulated air pressure by the air tank (AT) 74 and comprises a pin retracting valve (PRV) 214, an exhaust valve (EV) 216, a pin extending valve (PEV) 218 and an exhaust valve (EV) 220. And these valves like those in the other control circuits are operated by the master control valve center (MCVC) 100 under the direction of the vehicle operator from the central command module (CCM) 102. And with the pin retracting valve 214 and exhaust valve 220 opened and the pin extending valve 218 and exhaust valve 216 closed by the MCVC 100 under vehicle operator control at the CCM 102, the locking pin 190 is positioned by the actuator 186 in its retracted position below the top side 162 of the trailer chassis as shown in phantom lines in FIG. 12 thereby allowing the trailer chassis 36 to pivot about the king pin 158 while hitched to the truck chassis 20. And with the pin extending valve 218 and exhaust valve 216 opened and the pin retracting valve 214 and exhaust valve 220 closed by the MCVC 100 under operator control at the CCM 102, the locking pin 190 is positioned by the locking pin actuator 186 in its extended position fully engaging the bushing 196 as shown in solid lines in FIG. 12 and thereby preventing the trailer chassis 36 from pivoting about the king pin 158 while hitched to the truck chassis 20.

Describing now the overall operation of the trailer hitch 42 that is provided starting with establishing stowage of the hitching module 164 on the dump truck 10 with the trailer chassis 36 unhitched as shown in FIG. 15, the hitching module is located by the pneumatically-operated actuator 170 in its retracted position on the carriage 104 and the hydraulically-operated actuators 108 are fully retracted with the hydraulic circuit 140 by the MCVC 100 under operator control at the CCM 102. Whereby the hydraulically-operated actuators 108 on such retraction raise and locate the carriage 104 with the hitching module 164 above the truck dump body 14 and with the carriage and hitching module maintained in an upright condition during both raising and lowering by the force of gravity and the cross-member 114 joining the suspension arms 106 being positioned to be engaged by the top part 124 of the carriage to prevent the carriage and hitching module from otherwise pivoting about their supporting shaft 116 in the clockwise direction. And with the upright condition of the carriage 104 and hitching module 164 maintained by the cross-member 114 when the truck dump body 16 is tilted by the hydraulically-operated tilting mechanism 44 to provide for dumping a load as shown in FIG. 16 and also when being lowered for hitching operation as shown in phantom lines in FIG. 23.

Figure 21:
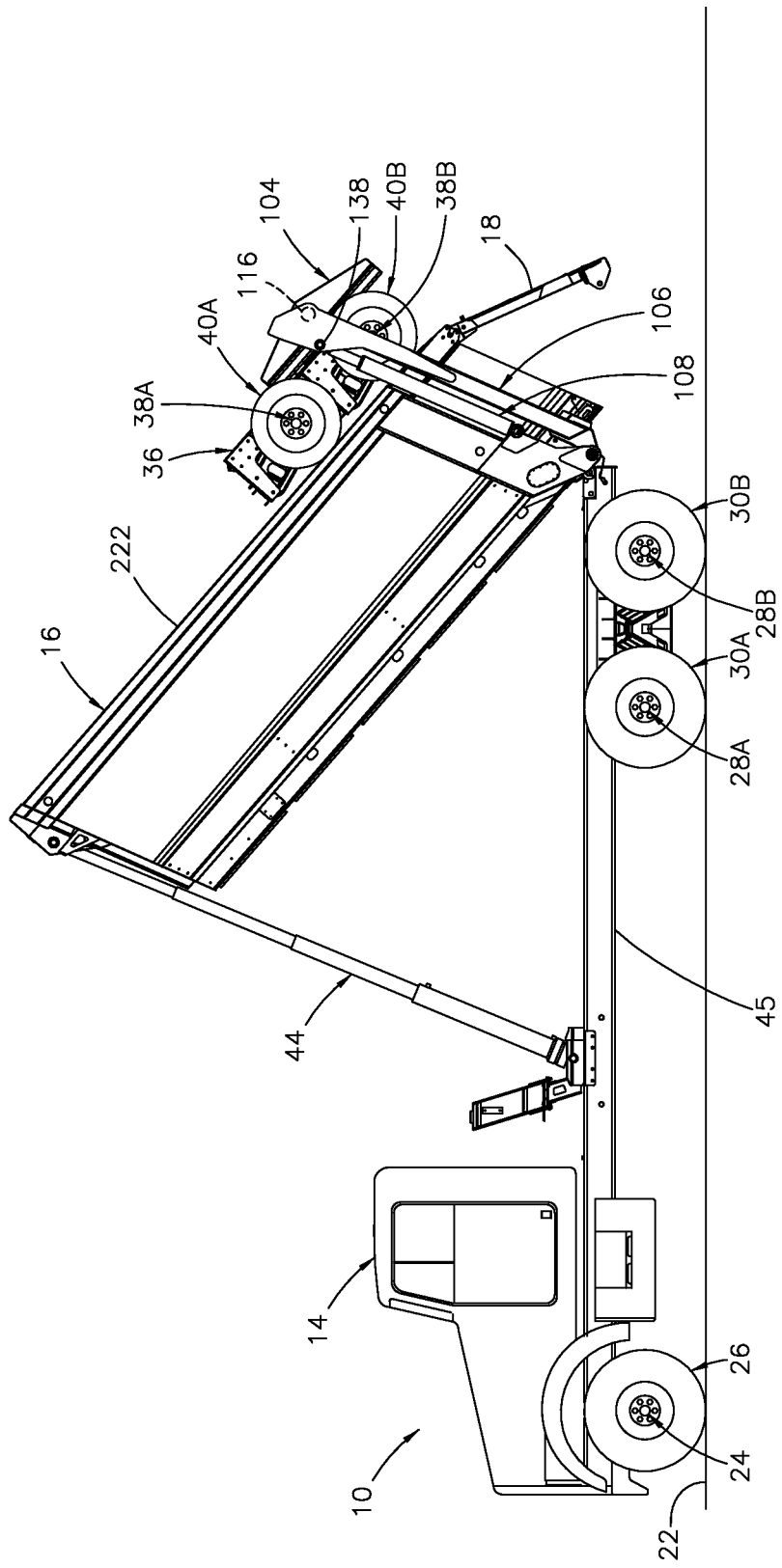
FIG. 21 is a view like FIG. 19 but showing the dump body of the dump truck tilted with its tailgate open to provide for dumping a load.

Moreover, the trailer chassis 36 without its dump body 34 as shown in FIG. 17 and while hitched to the carriage 104 and thus to the truck chassis 20 can be firmly stowed above the truck body as shown in FIGS. 18-21. Wherein the trailer chassis 36 following hitching with the king pin 158 and latching mechanism 160 is prevented from turning with respect to the hitching module 164 and thereby the carriage 104 while held in longitudinal alignment therewith by the locking pin 190 with operation of the pneumatically-operated locking pin actuator 186 employing the use of the proximity switch 198 in detecting this alignment that is necessary for the operation of the locking pin. And the hydraulically-operated actuators 108 are then operated in the manner described previously with respect to raising and locating the carriage 104 and hitching module 164 above the truck dump body 16 with the trailer axle wheels 40A and 40B located above the top edges 222 of the truck dump body as shown in FIG. 18. But the hitching module 164 and thereby the trailer chassis 36 are now extended forward with respect to the carriage 104 by the pneumatically-operated actuator 170 as shown in FIGS. 19-21 whereby the rear trailer axle wheels 40B are located so as to not interfere with the operation of the dump body tail gate 18.

Then with the trailer chassis 36 extended forward, both of the trailer axles 38A and 38B are lowered by the air springs 70A and 70B with a prescribed pressure set by the regulator valves 84 and 92 that is lower than that in helping to support the truck chassis 20 and sufficient to force the trailer axle wheels 40A and 40B downward against the top edges 222 of the truck dump body sides to thereby firmly hold the carriage 104, hitching module 164 and trailer chassis 36 in place in a stowed condition. Wherein this holding action is accomplished with the assistance of the cross-member 114 by being strategically positioned to engage the top part 124 of the carriage 104 to prevent the carriage, hitching module and trailer chassis from pivoting about the carriage shaft 116 in the clockwise direction as viewed in FIGS. 19 and 21 in reaction to the downward force then being applied on the trailer axles 38A and 38B by the pressurized air springs 70A and 70B. And thus while the dump truck 10 is moving with the dump body 16 in an upright condition as shown in FIG. 19 and also while the truck is stationary and the dump body is tilted to provide for dumping a load as shown in FIG. 21. And alternatively, the holding of the carriage 104, hitching module 164 and trailer chassis 36 firmly in place in their stowed condition is also accomplished with the assistance of the cross-member 114 using only the forwardly-located air springs 70A wherein these air springs are supplied with a suitable air pressure while exhausting the rearwardly-located air springs 70B.

Figure 22:
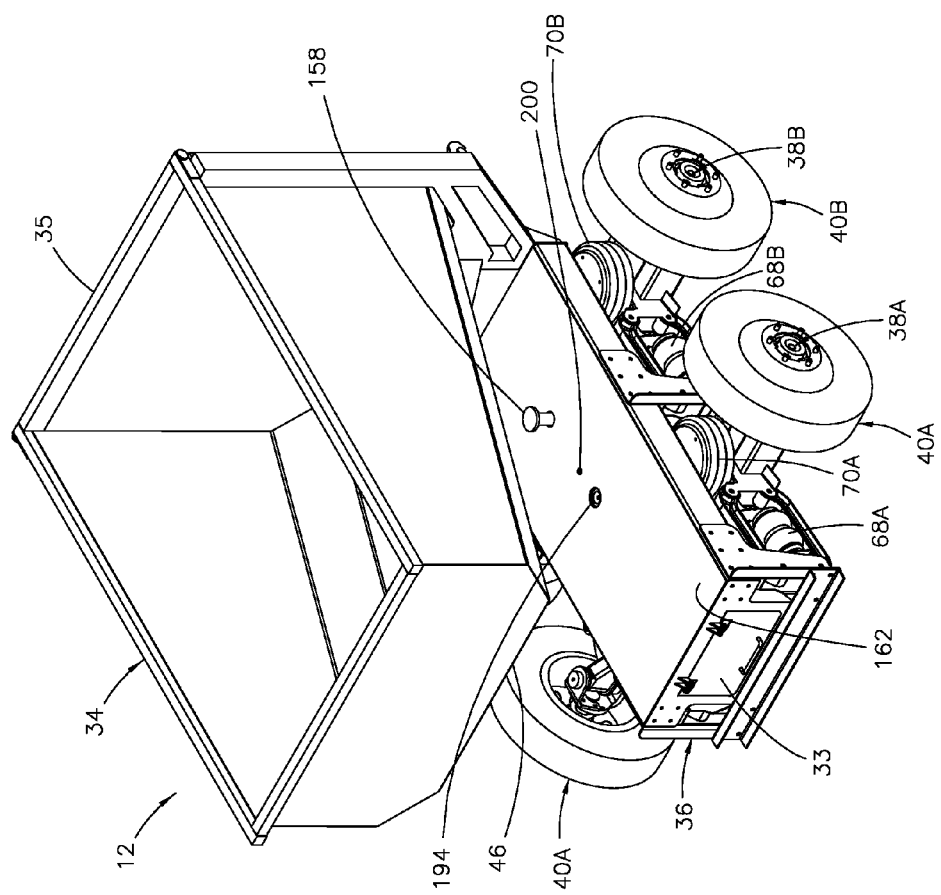
FIG. 22 is a perspective view of the trailer in the above figures but with the front supporting members of the trailer dump body temporarily removed in preparation for the trailer hitch hitching the trailer chassis to the dump truck chassis.
Figure 23:
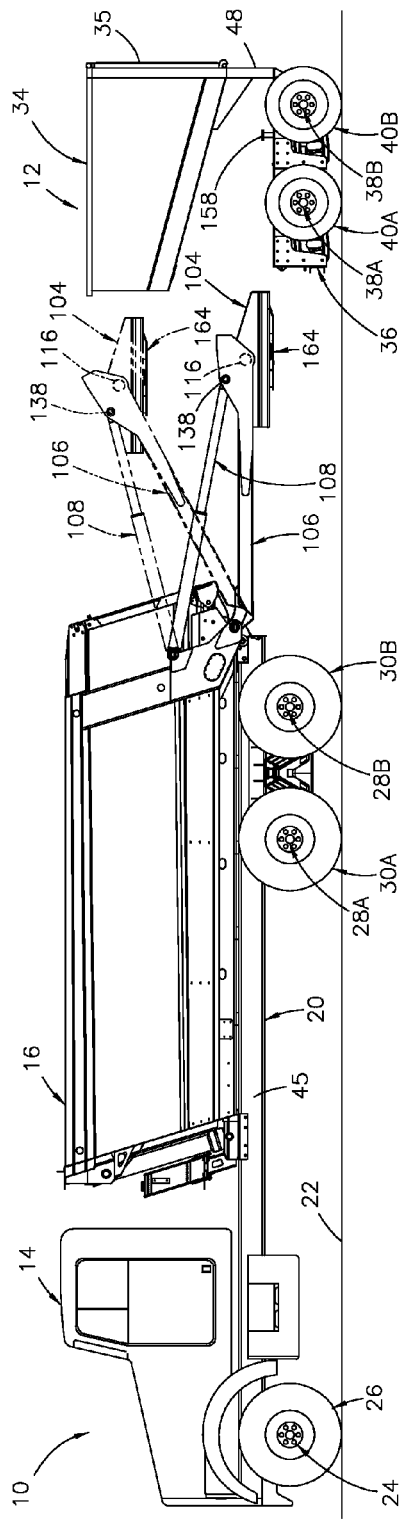
FIG. 23 a side view of the dump truck and the trailer in the above figures showing the trailer hitch hitching the trailer chassis to the dump truck chassis and the front supporting members of the trailer dump body in place.

Describing now the hitching of the trailer 12 with its dump body 34 to the motor vehicle chassis 20 and with the trailer chassis 36 established at a desired ride height by the air springs 70A and 70B, the hitching module 164 established in its stowed condition shown in FIG. 15 as described above and the trailer dump body front support members 50 temporarily removed as shown in FIGS. 22 and 23, the hydraulically-operated actuators 108 are extended with the carriage 104 and hitching module 164 then passing through an intermediate condition shown in phantom lines in FIG. 23 until the latching mechanism 160 supported by the hitching nodule 164 is positioned with maneuvering of the dump truck to engage with the king pin 158 on the trailer chassis 36 as shown in solid lines in FIG. 23. And with this condition established, the hydraulically-operated actuators 108 are extended and the dump truck is then driven backward to effect the hitching of the trailer chassis 36 to the truck chassis 20 with the king pin 158 and latching mechanism 160 where after the trailer dump body front supports members 50 are fastened in place as shown in FIGS. 1-3. And with the trailer hitch 42 in addition to hitching the trailer chassis 36 to the truck chassis 20 also causing the trailer chassis to help support the truck chassis to a variable degree via the trailer hitch when load is added to the truck chassis regardless of the load on the trailer chassis. Wherein the hydraulically-operated actuators 108 then provide a resisting force acting on the trailer chassis 36 via the shared carriage and hitching module mounting shaft 116 at a location substantially midway between the trailer axles 38A and 38B throughout their range of movement. Thereby enabling the trailer axle air springs 70A and 70B to force the trailer axle wheels 40A and 40B respectively against the road surface 22 and force the respective trailer axles 38A and 38B while supporting the trailer chassis 36 to also cause the trailer chassis to help support the truck chassis 20 via the trailer hitch 42 to the degree determined by the pressure supplied to the trailer axle air springs. And wherein the ability to separately control the pressure supplied to the trailer axle air springs 70A and 70B provides flexibility in addressing various circumstances that can exist.

For example when the trailer axles 38A and 38B are not bearing equal weight as the result of the external load on these axles including when the weight of the trailer chassis 36 and that of its dump body 34 with or without an added load is not equally distributed to the two trailer axles, the axle bearing more weight will then require more lift force to maintain the desired ride height of the trailer chassis and also that of the truck chassis when helping to support the latter via the trailer hitch 42. And if the trailer axle air springs 70A and 70B are functionally equivalent and the same air pressure is applied to both, the result will be the trailer axle with greater weight will have its air springs more compressed than the other trailer axle since the air springs increase lift force as they are compressed and decrease lift force as they are extended at constant air pressure. And this would undesirably result in the trailer chassis 38 being angled relative to the road (not level) and with the degree of the angle being proportional to the difference in weight acting on the trailer axles. But with the control circuits for the air springs 70A and 70B being separate, higher air pressure can be applied to the air springs at the trailer axle bearing more weight so that the air springs at both of the trailer axles are at the same ride height but provide different lift force. Furthermore, when equal lift force is desired by the trailer axles and the air springs 70A and 70B are not functionally equivalent, they may not be equal in reacting to the air spring force being applied such that equal air pressure does not mean equal down force and as a result, one may require higher air pressure than the other to achieve the same lift force.

Continuing on with the operation of the trailer axle suspension systems 54A and 54B with the trailer axles 38A and 38B helping to support the truck chassis 20 via the trailer hitch 42, the trailer axle wheels 40A and 40B at one side or both sides of the trailer chassis 36 while sequentially traveling over a bump in the road surface are allowed to travel up and down until the trailer axle air springs 70A and 70B are fully compressed. In which case, the trailer axles are then allowed to continue to travel upward if necessary because of the height of the bump and to the extent allowed of the carriage 104 provided by the actuator gas springs 130 in allowing road forced retraction of the hydraulically-operated actuators 108 to accommodate such extended upward travel of the trailer axles. On the other hand, the trailer axles 38A and 38B continue to help support the truck chassis 20 via the trailer hitch 42 while the trailer axle wheels 40A and 40B at one side or both sides of the trailer chassis sequentially travel over a depression such as a pothole in the road surface. And in that case the trailer axles 38A and 38B maintain their support of the truck chassis 20 via the trailer hitch 42 until the trailer axle air springs 70A and 70B are fully extended and thereby limit further downward trailer axle movement.

Figure 24:
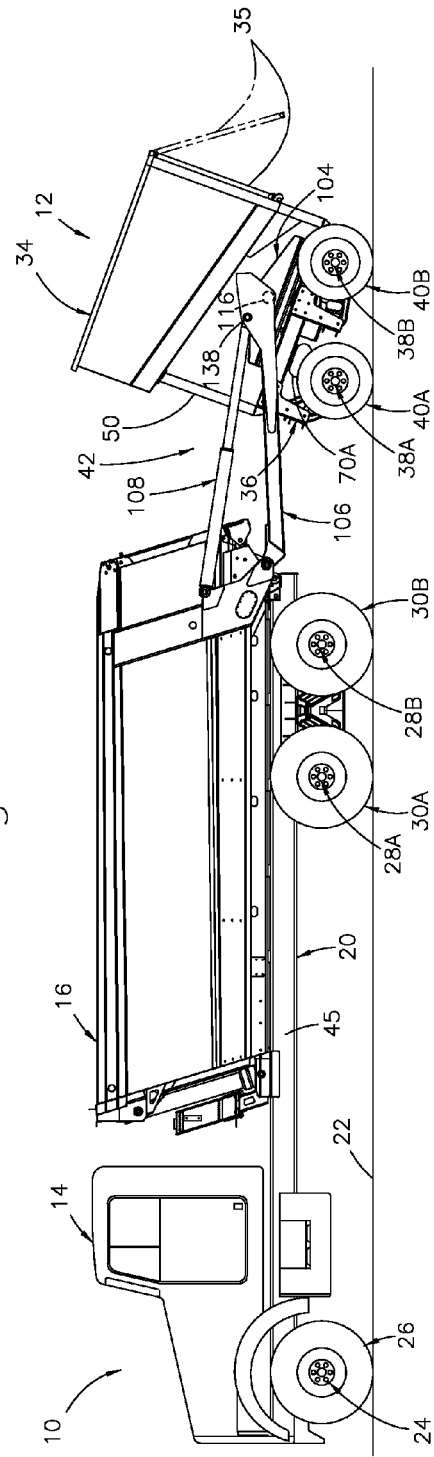
FIG. 24 is a view like FIG. 23 but showing the trailer dump tilted as enabled by the trailer hitch and with its tailgate open to provide for dumping a load.

Moreover, the trailer hitch 42 while hitching the trailer chassis 36 to the truck chassis 20 allows the trailer dump body 34 to be tilted to provide for dumping a load by tilting the hitched trailer chassis 36 and thereby the trailer dump body as shown in FIG. 24. With this being accomplished with the trailer axle suspension systems 54A and 54B by exhausting the rear air springs 70B and pressurizing the rear pneumatically-operated actuators 68B to raise the rear trailer axle 38B to its stowed condition on the trailer chassis 36 while forcing full downward deployment of the front trailer axle 38A from the trailer chassis 36 with the front air springs 70A.

Apart from bumps and depressions in the road surface, there can occur significant differences in elevation between the road surface supporting the truck axles 24, 28A and 28B and that supporting the trailer axles 38A and 38B wherein the trailer hitch 42 enables the trailer axles to continue to help in supporting the truck chassis 20. For example, in the road situation shown in FIG. 25 with the actuators 108 remaining extended in holding the position of the suspension arms 106 relative to the truck chassis 20, the trailer axles 38A and 38B are shown traveling on an upwardly inclined section 22A in the road surface 22 behind the truck axles 24, 28A and 28B. Resulting in the trailer axles 38A and 38B then being at significantly different elevations below that of the truck axles and forcing the trailer chassis 36 together with the hitching module 164 and carriage 40 to pivot on the suspension arms 106 in the clockwise direction enabled by the shaft 116 and assume the same angle as the road section 20A and thereby adjust thereto. Whereby the trailer axle wheels 40A and 40B with the action of the air springs 70A and 70B have remained in forced contact with the road section 22A and the trailer axles 38A and 38B continue to help in supporting the truck chassis 20 and with the ability of the trailer axle suspension systems 54A and 54B to accommodate steeper inclines behind the truck axles until the air springs 70A and 70B when fully extended loose road contact.

And by further example in the road situation shown in FIG. 26 with the actuators 108 remaining extended in holding the position of the suspension arms 106 relative to the truck chassis 20, the trailer axles 38A and 38B are shown traveling on a level section 22B in the road surface 22 that is behind and below that at the truck axles 24, 28A and 28B. And the air springs 70A and 70B have forced the trailer axles 38A and 38B downward without accompanying pivotal movement of the trailer chassis 36 together with the hitching module 164 and carriage 104 relative to the suspension arms 106. Whereby the trailer axle wheels 40A and 40B have remained in forced contact with the road surface with the down force applied by the air springs 70A and 70B and continue in helping to support the truck chassis 20 and with the ability of the trailer axle suspension systems 54A and 54B to accommodate larger elevation differences of this kind to the extent enabled by the air springs 70A and 70B.

Figure 27:
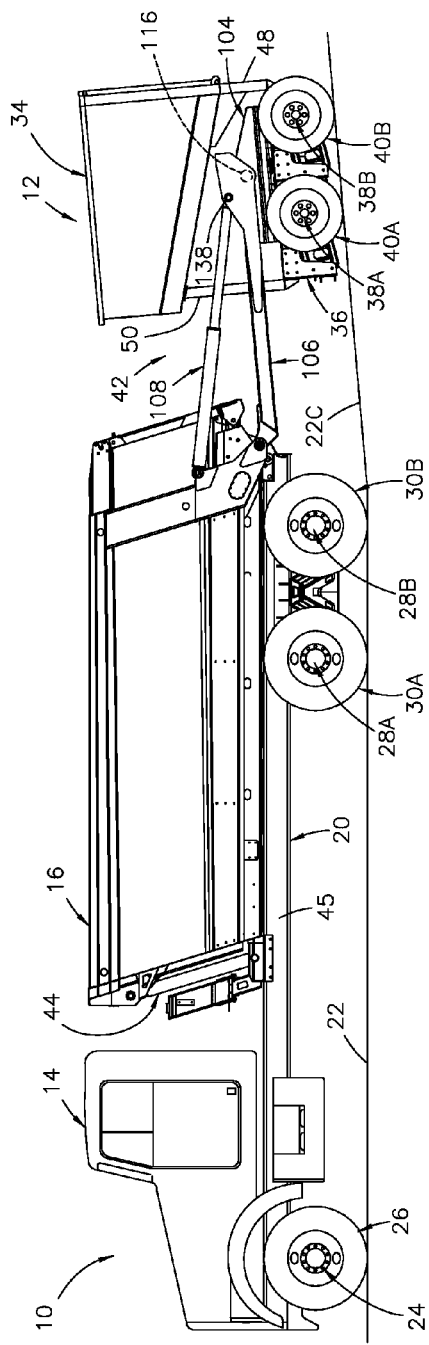

Referring now to the road situation shown in FIG. 27, the trailer axles 38A and 38B are shown traveling on a downwardly inclined section 22C in the road surface 22 that is behind the truck axles 24, 28A and 28B and thereby requires location of the trailer axles at different elevations on the road section 22C that are above the road elevation at the truck axles and to an extent that is greater than that allowed by full compression of the trailer axle air springs 70A and 70B and accompanying forced pivoting of the trailer chassis 36 together with the hitching module 164 and carriage 104 with respect to the suspension arms 106 in assuming the angle of this road section and thus in the ability of the trailer axles to continue to help support the truck chassis in this situation beyond that enabled by the air springs alone. And in accommodating this road situation, the trailer axle wheels 40A and 40B with their forced contact with the road section 22C by the air springs 70A and 70B have effected forced retraction of the hydraulically-operated actuators 108 from their extended condition by the action of the actuator gas springs 130 and thereby enabling the trailer chassis 36 together with the hitching module 164 and carriage 104 to pivot in the counter-clockwise direction in assuming the same angle as the downwardly inclined road section 22C and thereby adjust thereto. And thereby allowing the trailer chassis 36 to have raised with respect to the truck chassis 20 while the actuators 108 continue to provide resisting force on the trailer chassis enabling the forced loading of the trailer axles to help support the truck chassis 20. Whereby the trailer axle wheels 40A and 40B have remained in forced contact with the road section 20C and the trailer axles 38A and 38B continue to help in supporting the truck chassis 20 under the action of the air springs 70A and 70B and with the ability of the trailer axle suspension systems 54A and 54B to accommodate steeper downwardly inclined road sections behind the primary axles to the extent enabled by the actuator gas springs 130.

Figure 28:
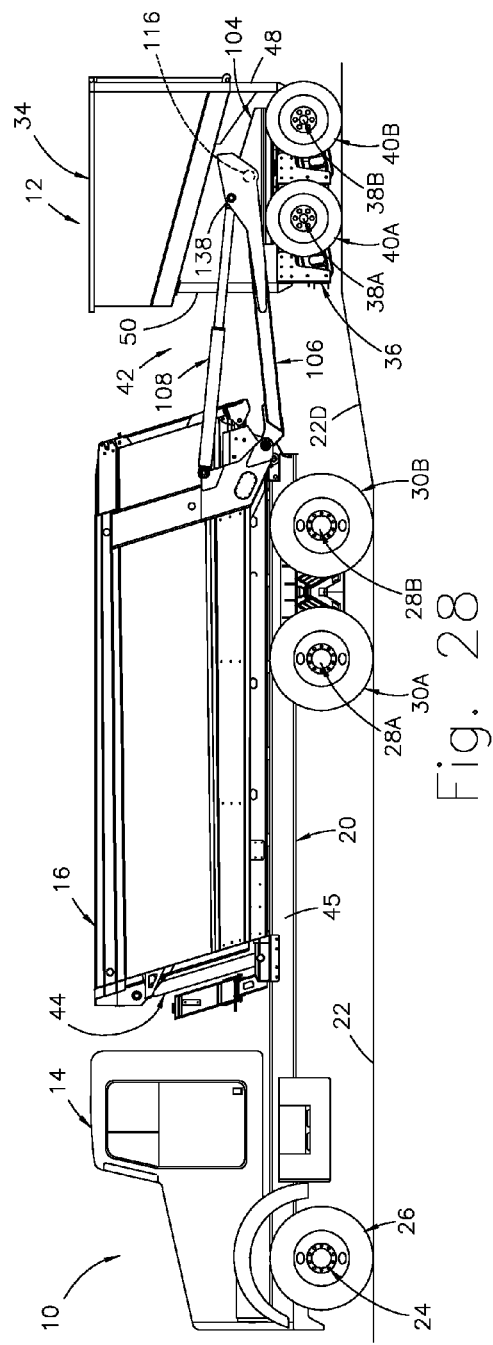

Referring now to the road situation shown in FIG. 28, the trailer axles 38A and 38B are shown traveling on a level section 22D in the road surface 22 that is behind and above the elevation of the road surface at the truck axles 24, 28A and 28B. And like in the FIG. 25 road situation in accommodating this road situation, the hydraulically-operated actuators 108 enabled by the gas springs 130 have partially retracted from their extended condition while continuing to provide a resisting force enabling the loading of the trailer axles 38A and 38B with the air springs 70A and 70B with accompanying pivotal movement of the trailer chassis 36 together with the hitching module 164 and carriage 104 relative to the suspension arms 106 in the clockwise direction while remaining upright. Whereby the trailer axles 38A and 38B are forced to continue in helping to support the truck chassis 20 on the level section 22D and with the ability of the trailer axle suspension systems 54A and 54B to accommodate larger elevation differences of this kind to the extent enabled by the gas springs 130.

In considering the different road situations that can be encountered including those that have been shown and described, the air springs 70A and 70B are like those generally used to provide a lift force on the motor vehicle chassis with pusher axles, tag axles and trailing axles. And as these air springs compress, their diameter increases. As a result, when a constant air pressure is supplied to the air springs, the lift force produced by the air springs is least when they are fully extended and their diameters are minimized, and is greatest when they are fully compressed and their diameters are maximized. And for example and with reference to the different road situations shown in FIGS. 1 and 25-28, if 40 psi air pressure is maintained in the air springs 70A and 70B, then the maximum force with the these air springs fully compressed is capable of producing a total lift force of 22,000 lbs. And the hydraulic pressure forcing the extension of the actuators 108 is determined so that the resisting force of these actuators is 22,000 pounds and these actuators will retract only when this force is exceeded and only when the air springs are fully compressed. With the result that lower elevations at the trailer axle wheels 40A and 40B are accommodated by the full extension of the air springs with the actuators 108 remaining hydraulically rigid as shown in FIGS. 25 and 26 while higher elevations at the trailer axle wheels are accommodated by compression of the air springs and subsequent retracting of the actuators 108 provided by the action of the actuator gas springs 130 as shown in FIGS. 27 and 28. And thus the lift force provided by the trailer axles 38A and 38B when the air springs 70A and 70B are maintained with constant pressure will vary as the truck and trailer wheels travel over elevation changes in the road surface. With the trailer axles providing less lift force when their wheels are at lower elevations than the truck axle wheels and greater lift force when the trailer axle wheels are at higher elevations than the truck. And if constant lift force by the trailer axles is desired throughout elevation changes at their wheels, this can be provided in controlling the air pressure supplied in an appropriate manner during these transitional conditions.

In addition to the above manner of operation of the trailer hitch 42, it will also be appreciated that the air springs 70A and 70B can be maintained at a constant or set pressure. And in that case the hydraulically-operated actuators 108 are operated to apply a force on the trailer chassis 36 forcing its downward movement in causing the trailer chassis to help support the truck chassis 20 to a variable degree thus providing the trailer axle suspension systems 54A and 54B with a set spring action instead of the variable spring action they provide by varying the pressure in the air springs in establishing the degree of assisting motor vehicle support provided by the trailer chassis. Instead of the actuators 108 providing a resisting force on the trailer chassis and the pressure in the trailer axle air springs 70A and 70B being controlled to vary the support of the truck chassis provided by the trailer chassis as previously described.

Furthermore, the trailer hitch according to the present invention is applicable to a wide range of trailers as shown with another exemplary embodiment in FIGS. 29 and 30. Wherein the trailer hitch 42 is adapted to hitch a trailer 224 to the dump truck 10 and the trailer comprises a chassis 226 that supports a load container 228 that is fixed to the top of the trailer chassis at a location rearward of where the king pin 158 is fixed and has side-hinged rear doors 230. And the trailer chassis 226 is supported on the road surface 22 by only one axle 232 with self-steering wheels 234 located near the front end of the trailer chassis. And the trailer chassis 226 when unhitched is temporarily supported by a leg 236 located near to the rear end of the trailer chassis. Wherein the leg 236 is hinged at its upper end to the trailer chassis 226 at a laterally-centered location to maintain the trailer 224 upright when not hitched as shown in FIG. 29 and is latched to the trailer chassis in an out of the way location when the trailer chassis 226 is hitched by the trailer hitch 42 to the truck chassis 20 as shown in FIG. 30.

In the above exemplary embodiment, the trailer axle 232 is suspended from the trailer chassis 226 with a suspension system like that of each of the trailer axles previously described with the associated air springs and stowing actuators. And the pneumatically-operated actuator 170 and flange bearings 118 are eliminated and instead the hitching module 164 is now fixed to the carriage 104. And the shaft 116 that is welded to the carriage 104 is now also welded at its ends to the suspension arms 106 so that the shaft 116 is located substantially directly above the trailer axle 232 throughout the range of movement of the trailer axle 232 when the trailer chassis 226 is hitched to the truck chassis by the trailer hitch 42 as shown in FIG. 30. Whereby the carriage 104 and thus the hitching module 164 are now prevented from pivoting with respect to the suspension arms 106 that could otherwise occur when the trailer axle 232 is helping to support the truck chassis 20 as well as when the suspension arms are swung to stow the carriage 104 and hitching module 164. And either without the trailer chassis 226 as shown in FIG. 29 or possibly with the trailer chassis and also the load container 228 depending on the weight of the load and road height limitations.

Referring again to FIG. 30, the trailer hitch 42 on hitching the trailer chassis 226 to the truck chassis 20 like in the manner described previously with respect to the trailer 12 is available to provide a resisting force via the shaft 116 acting on the trailer chassis 226 at a location substantially directly above the trailer axle 232 throughout its range of movement with the hydraulically-operated actuators 108. Thereby enabling the air springs associated with the trailer axle 232 to force the trailer axle wheels 234 against the road surface 22 and thereby force the trailer axle 232 to alone cause the trailer chassis 226 to help support the truck chassis 20 to the extent determined by the controllable pressure supplied to the air springs. Or the air springs can be provided with a set pressure and thus a set spring action like in the manner previously describe with the hydraulically-operated actuators 108 then forcing downward trailer chassis movement in causing the trailer chassis 226 to help support the truck chassis 20 to the extent determined by the action of the hydraulically-operated actuators 108. And furthermore, the trailer chassis 226 in either case is selectively allowed to pivot about the king pin 158 and be prevented from such pivoting by the locking pin 190 in the same manner described previously with respect to the dump truck 10 and trailer 12.

Moreover, the trailer hitch according to the present invention is applicable to a wide range of motor vehicles as well as trailers as shown with the exemplary embodiment in FIGS. 31 and 32. Wherein the motor vehicle is a tow truck 238 and the trailer hitch 42 is adapted to hitch a trailer 240 of considerably long length to the tow truck. With the tow truck having a cab 242 that serves as a vehicle operator and passenger compartment and a rearwardly located trailer hitch supporting assembly 244 that is fixed to and supported by the tow truck's chassis 246. And like the dump truck chassis 20, the tow truck chassis 246 is supported on the road surface 22 by primary axles comprising a forwardly-located front axle 248 with steerable wheels 250 at its outboard ends under the control of the vehicle operator and rearwardly-located powered tandem axles 252A and 252B with dual wheels 254A and 254B respectively at their outboard ends. Wherein the front axle 248 and tandem rear axles 252A and 252B are suspended from the tow truck chassis 246 by conventional suspension systems with the suspension system 256 suspending the powered tandem axles in this exemplary embodiment also being of the walking-beam type.

And in this embodiment of the present invention, the trailer 240 has a load container 258 of considerably long length with side-hinged rear doors 260 and is fixed to and supported by a chassis 262. And the trailer chassis 262 is supported on the road surface 22 by a forwardly-located axle 264 with self-steering wheels 266 at its outboard ends and rearwardly-located tandem axles 268A and 268B with dual wheels 270A and 270B respectively at their outboard ends. And wherein the front trailer axle 264 is suspended from the trailer chassis 262 with a suspension system like that of each of the trailer axles previously described having the associated pneumatically-operated axle stowing actuators 68A or 68B and air springs 70A or 70B and. Whereas the rear trailer axles 268A and 268B are suspended from the trailer chassis 260 in this exemplary embodiment with a conventional walking-beam type suspension system 272.

And the trailer hitch 42 is now suspended with the suspension arms 106 and hydraulically-operated actuators 108 from the trailer hitch supporting assembly 244 and thereby from the truck chassis 246 and with the king pin 158 fixed to the top of the trailer chassis 262 beneath an upwardly-angled forward section 274 of the floor of the load container 258 at a location rearward of the front trailer axle 264 and remote from the rear tandem trailer axles 268A and 268B. In addition, the hitching module 164 is now fixed to the carriage 104 that is now without the pneumatically-operated actuator 170 and with the hitching module positioned under the carriage 104 so that the shaft 116 where the resisting force is applied to the trailer chassis 262 by the hydraulically-operated actuators 108 is located above and rearward of the front trailer axle 264 throughout the range of movement of this axle while the trailer chassis 262 is hitched to the truck chassis 246 by the trailer hitch 42 as shown in FIG. 32.

Referring again to FIG. 31, the carriage 104 together with the hitching module 164 is raised and stowed on the tow truck above the tow truck rear axles 252A and 252B by the hydraulically-operated actuators 108 as shown in phantom lines. But now in arriving at their stowed condition, the carriage 104 together with the hitching module 164 have pivoted counter-clockwise about the shaft 116 unlike the exemplary embodiment in FIGS. 29 and 30 and in reaction to the force of gravity and are then retained in this stowed condition by the top of the carriage 104 engaging the cross-member 114 that joins the suspension arms 106 and prevents their further pivoting in this direction.

And referring again to FIG. 32, the trailer hitch 42 on hitching the trailer chassis 262 to the tow truck chassis 246 like in the manner described previously with respect to the trailer 12 is available to provide a resisting force acting on the trailer chassis 262 with the hydraulically-operated actuators 108 enabling the air springs associated with the trailer axle 264 to force the trailer axle wheels 266 against the road surface 22 and thereby force the trailer axle 264 and thus the trailer chassis 262 to help support the tow truck chassis to the extent determined by the controllable pressure supplied to these air springs. Or the air springs can be provided with a set pressure and thus a set spring action like in the manner previously describe with the hydraulically-operated actuators 108 then forcing downward trailer chassis movement in causing the trailer chassis 262 to help support the tow truck chassis 246 to the extent determined by the action of the hydraulically-operated actuators 108. And furthermore, the trailer chassis 262 is selectively allowed to pivot about the king pin 158 and be prevented from such pivoting by the locking pin actuator 186 in the same manner described previously with respect to the dump truck 10 and trailer 12.

Moreover, in the embodiments thus far described the trailer hitch 42 has been applied to a trailer having one or more axles suspended from the trailer chassis with an air spring suspension system. And it will be understood that these trailer axles could also be suspended from the trailer chassis with other suitable forms of suspension systems such as those employing elastic springs in the form of leaf springs, coil springs, torsion bars made of steel or a suitable composite material or some combination thereof and including the use of components made of an elastomeric material such as rubber.

Figure 37:
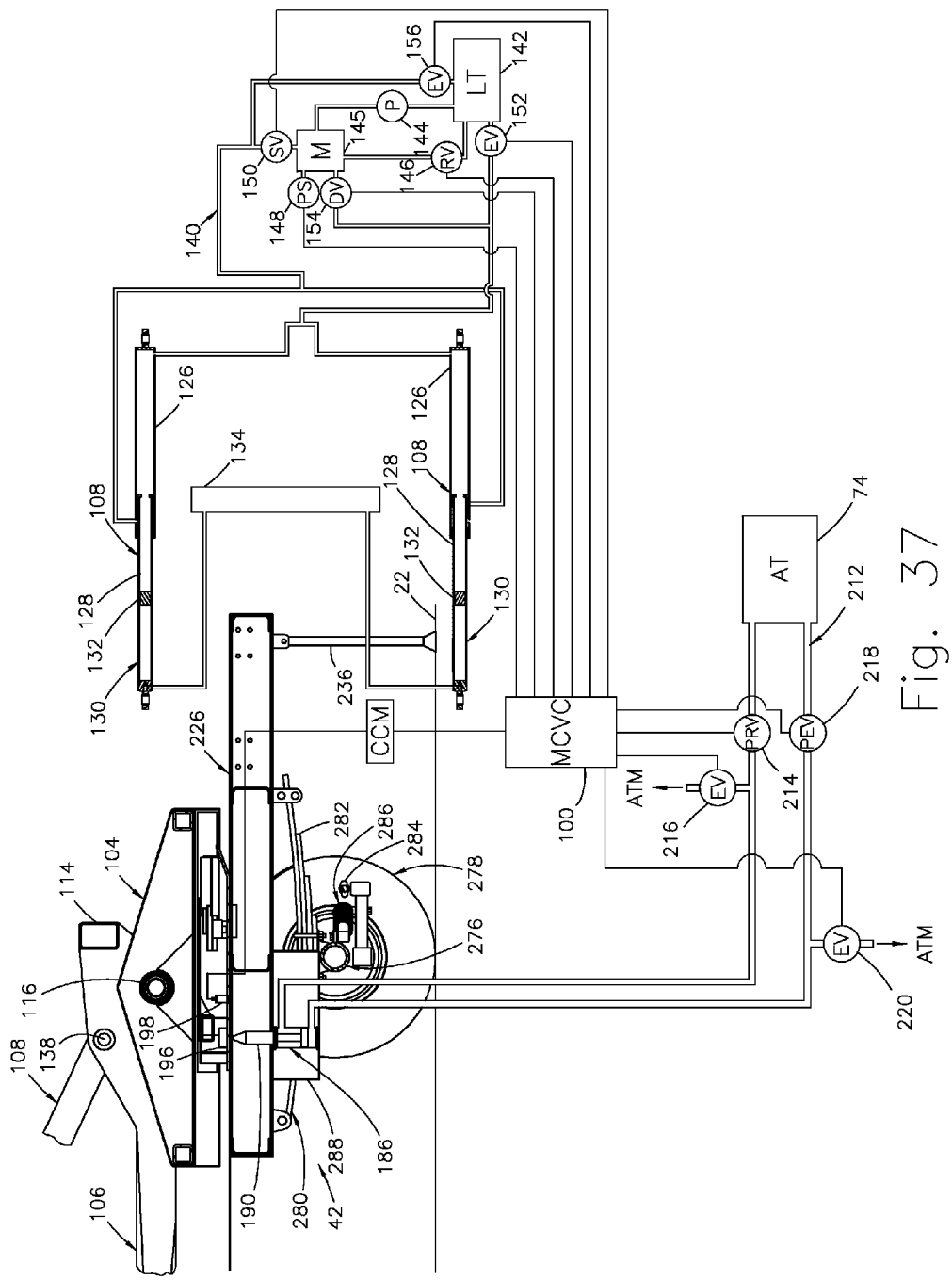
FIG. 37 is a schematic of the control systems in FIGS. 13 and 14 employed to control the trailer hitch as employed with the dump truck and trailer in FIGS. 33-36 and includes a view taken along the lines 37-37 in FIG. 35 when looking in the direction of the arrows with the load container removed.

For example, the trailer hitch 42 with the cross-shaft 116 fixed to the suspension arms 106 like with the embodiment in FIGS. 29 and 30 previously described is applied to the dump truck 10 and the trailer 224 as shown in FIGS. 33-37. Wherein the trailer 224 is like the trailer in FIGS. 29 and 30 with the chassis 226 supporting the load container 228 and having the temporary supporting leg 236 to support the trailer in its upright position when the trailer is not hitched. And with the hitching module 164 fixed in position on the carriage 104 and the carriage 104 prevented from pivoting with respect to the suspension arms 106 by the carriage shaft 116 being welded at its ends to these arms. But the trailer chassis 226 is now supported by an axle 276 with self-steering wheels 278 that is suspended from opposite sides of the trailer chassis 226 with elastic spring action by a semi-elliptic leaf spring suspension system 280 having leaf spring arrangements 282 extending longitudinally of the trailer chassis between side members of the trailer chassis and the axle 276. And wherein the steering arms of the wheels 278 are linked by a tie rod 284 and coil spring/shock absorber assemblies 286 are connected between the steering arms and the axle 276. And with this type of suspension thus providing a set spring action like that of air springs with a set pressure and thereby allowing a significant reduction in the extent of the control system for operating the trailer hitch 42 as applied to the trailer 224 with the trailer axle suspension system 280 as shown in FIG. 37.

Wherein for the control of the trailer hitch 42 in the FIGS. 33-36 exemplary there remains as shown in FIG. 37 the hydraulic control circuit 140 for the hydraulically-operated actuators 108 and the pneumatic control circuit 212 for the pneumatically-operated locking pin actuator 186 but not the need for the pneumatic control circuit 72 for trailer suspension air springs. And with the control circuits 140 and 212 operated with the MCVC 100 according to operator command at the CCM 102, the trailer hitch 42 is operated like previously described with regard to stowage of the suspended portion of the trailer hitch 42 on the dump truck 10 as shown in phantom lines in FIG. 33 and establishing the hitching of the trailer 224 to the dump truck 10 as shown in FIG. 34. And in completing the hitching as shown in FIG. 34, the hydraulically-operated actuators 108 are not fully extended and thus able to extend further to accommodate the trailer wheels 278 traveling over elevations lower than that at the truck axles while the gas springs 130 maintain hydraulic pressure in the actuators 108. And on the other hand, the actuators 108 are able to retract further to accommodate the trailer wheels traveling over elevations higher than that at the truck axles while the gas springs 130 maintain hydraulic pressure in the actuators 108.

Describing now the operation of the trailer hitch 42 with the trailer axle leaf suspension system 280 following the hitching of the trailer chassis 226 to the truck chassis 20, the hydraulically-operated actuators 108 are operated to force downward trailer chassis movement against the set spring action of the suspension system 280 in causing the trailer chassis 226 to help support the dump truck chassis 20 to the extent determined by the action of the hydraulically-operated actuators 108. And wherein the hitched trailer chassis 226 may or may not be allowed to turn with respect to the dump truck chassis 20 with the control of the trailer hitch locking pin 190 by the pneumatically-operated actuator 186 that is mounted in a housing 288 fixed to the underside of the chassis 226. See FIGS. 35 and 37.

Furthermore, it will be appreciated that the trailer axle 276 with its leaf spring suspension system 280 could take the place of each of the trailer axles with an air spring suspension system previously described and taking into account that the leaf springs could be arranged transversely of the trailer chassis or another form of semi-elliptic leaf springs employed or that other structural forms of springs such as coil springs and torsion bars could be employed and for example to accommodate space limitations between closely adjacent trailer axles. And it will be recalled that in the case of the trailer chassis being solely supported by two axles with air spring suspension systems and with the trailer chassis 36 hitched to the dump truck chassis 20 as shown in FIGS. 18-21, the air springs 70A and 70B without air pressure can be fully compressed so as to minimize the overall height of the trailer chassis and its axles in order to clear the dump body 16 as the suspension arms 106 are raised and lowered by the hydraulically-operated actuators 108 for stowage and deployment of the hitched trailer chassis in order to prevent interference by the dump body including its tailgate during such operation. And in regard to stowage and once the suspension arms 106 are raised to the extent possible on full retraction of the actuators 108 and the hitched trailer chassis is positioned above the dump body, the air springs 70A and 70B or only the air springs 70A can be pressurized forcing the trailer axle wheels 40A and 40B against the top of the truck dump body or other form of load container to thereby firmly hold the hitched trailer chassis in place on the truck dump body when the truck is in motion and when the truck dump body is tilted to dump a load. And wherein the cross-member 114 extending between the suspension arms 106 prevents the hitched trailer chassis from pivoting in reaction to the force being applied by the air springs.

And with respect to stowage of a hitched trailer chassis in regard to the dump truck 10 when the trailer chassis is solely supported by one or two axles each with a suspension system that does not have air springs and instead has for example the leaf spring suspension system 280 with the singular trailer chassis supporting axle 276 as described above and a pair of trailer chassis supporting axles like those in FIGS. 1-28 but with leaf spring suspension systems like that in the U.S. patent application Ser. No. 14/803,038 entitled "DUAL TRAILING AXLE SUSPENSION SYSTEM" these trailer axles with the trailer chassis hitched to the dump truck chassis 20 by the trailer hitch 42 will be extended from their trailer chassis by the springs in these suspension systems to the maximum extent as their wheels are lifted from a road surface when the hydraulically-operated actuators 108 are retracted. And to compensate for this in stowing the hitched trailer chassis on the dump truck, the suspension springs 106 and hydraulically-operated actuators 108 are lengthened compared to that utilized with the pneumatically-operated actuators 68A and 68B and the air springs 70A and 70B such that the carriage supporting shaft 116 is further distanced from the suspension arm pivot pins 112 to the extent necessary for these trailer axle wheels to clear the top of the dump body 16 and tail gate 18 as the hitched trailer chassis passes over for stowage or deployment. And with the suspension arms 106 angled forward of vertical when the hydraulically-operated actuators 108 are fully retracted and the hitched trailer chassis is in the fully stowed position, the hitched trailer chassis moves downward toward the dump body after the suspension arms pass vertical in the stowage direction following further retraction of the hydraulically-operated actuators 108. With the trailer axle wheels then making contact with the top edges 222 of the dump body 16 before the hydraulically-operated actuators 108 are fully retracted whereby the springs in the associated trailer axle suspension systems are compressed to firmly hold the trailer axle wheels against the top edges of the dump body and thereby hold the hitched trailer chassis in place on the dump body when the actuators are eventually fully retracted. And wherein the cross-member 114 extending between the suspension arms 106 prevents the hitched trailer chassis from pivoting in reaction to the force being applied to compress the springs in the associated trailer axle suspension systems in providing the holding action. And wherein the above sequence of events is reversed to deploy the hitched trailer chassis with extension of the hydraulically-operated actuators 108.

It will also be appreciated that in addition to the above exemplary embodiments of the trailer hitch according to the present invention, the trailer hitch is readily adaptable to a wide range of both motor vehicles and trailers. For example, the motor vehicle can take various other forms such as refuse trucks, transit concrete mixing trucks, open-bed trucks, utility trucks, and military trucks. Wherein the motor vehicle may have only two primary axles with one of them powered and one or more pusher axles and/or tag axles for auxiliary use. Or the motor vehicle may have three primary axles with two of them powered as well as one or more pusher axles and/or tag axles for auxiliary use. And the trailer hitch is readily adaptable to accommodate such in the manner of operation described above with respect to both hitching and stowing the trailer hitch with respect to the particular motor vehicle. And the trailer can also take many different forms as to what the trailer chassis supports and have a wide range of supporting axles as the trailer hitch is basically adapted to accommodate a wide range of trailer axle arrangements as to the number of axles, their location and the type of suspension system suspending the trailer axe(s) from the trailer chassis whether is provides a variable spring action or a set spring action.

In addition, the gas springs associated with the hydraulically-operated actuators can have their piston arranged separate from the hydraulically-operated actuator piston to operate in a likewise hydraulic and gas pressured manner and separately provided with a gas accumulator of adequate volume with the prescribed gas pressure charge instead of with a common gas accumulator that serves both of the gas springs. Or the gas springs can be dispensed with if the added trailer axle movement they provide is not called for.

In addition, it will be appreciated that actuators providing the intended operation in the trailer chassis helping to support the motor vehicle chassis can be utilized that are not of the hydraulically-operated type as shown and take other forms. Such as pneumatically-operated actuators and ball nut and screw actuators suited to the objectives of the present invention. And it will also be appreciated that the trailer hitch latching mechanism can be released with a powered actuator rather than manually.

And thus the scope of the invention is intended to be limited only by the accompanying claims.

The invention claimed is:
1. A trailer hitch for hitching a load-transporting trailer to a motor vehicle wherein
the motor vehicle has a chassis supported by motor vehicle axles suspended from the motor vehicle chassis,
the trailer has a chassis supported by one or more trailer axles individually suspended from the trailer chassis with a suspension system that provides spring action for isolating road induced trailer axle movement from the trailer chassis,
the trailer chassis is able to wholly support a transportable load,
the trailer hitch comprises a trailer hitch suspension system and hitching means,
the trailer hitch suspension system suspends the hitching means from the motor vehicle chassis and applies a controllable resisting force or downwardly acting force on the hitching means during hitching operation, and
the hitching means releasably attaches the trailer chassis to the motor vehicle chassis and causes the trailer chassis to support the motor vehicle to a variable degree by acting on the trailer chassis in a manner determined by (a) the existing trailer axle suspension system spring action, (b) the existing transportable load supported by the trailer chassis, and (c) the force applied on the hitching means by the trailer hitch suspension system.

2. A trailer hitch for hitching a load-transporting trailer to a motor vehicle as set forth in claim 1 wherein
each trailer axle suspension system has air springs supplied with a controllable air pressure, and
the trailer hitch suspension system is adapted to forcibly resist upward trailer chassis movement by the air springs in causing the trailer chassis to help support the motor vehicle chassis.

3. A trailer hitch for hitching a load-transporting trailer to a motor vehicle as set forth in claim 1 wherein
each trailer axle suspension system has air springs with a set air pressure, and
the trailer hitch suspension system is adapted to force downward trailer chassis movement against the action of the air springs in causing the trailer chassis to help support the motor vehicle chassis.

4. A trailer hitch for hitching a load-transporting trailer to a motor vehicle as set forth in claim 1 wherein
each trailer axle suspension system has elastic springs with a set spring action, and
the trailer hitch suspension system is adapted to force downward trailer chassis movement against the action of the elastic springs in causing the trailer chassis to help support the motor vehicle chassis.

5. A trailer hitch for hitching a load-transporting trailer to a motor vehicle as set forth in claim 1 wherein
the hitching means is adapted to allow the trailer chassis to turn relative to the motor vehicle chassis and prevent such turning.

6. A trailer hitch for hitching a load-transporting trailer to a motor vehicle as set forth in claim 1 wherein
each trailer axle has self-steering wheels.

7. A trailer hitch for hitching a load-transporting trailer to a motor vehicle as set forth in claim 1 wherein
the trailer chassis is supported by two or more trailer axles individually suspended from the trailer chassis with a suspension system that provides spring action for isolating road induced trailer axle movement from the trailer chassis.

8. A trailer hitch for hitching a load-transporting trailer to a motor vehicle as set forth in claim 1 wherein
the trailer chassis is supported by two or more trailer axles individually suspended from the trailer chassis with a suspension system that provides spring action for isolating trailer axle movement from the trailer chassis, and
the hitching means is adapted to hitch the trailer chassis to the motor vehicle chassis at a location on the trailer chassis rearward of the forward-most trailer axle.

9. A trailer hitch for hitching a load-transporting trailer to a motor vehicle as set forth in claim 1 wherein
the trailer hitch suspension system includes a pair of actuators that act through the hitching means in causing the trailer chassis to help support the motor vehicle chassis.

10. A trailer hitch for hitching a load-transporting trailer to a motor vehicle as set forth in claim 1 wherein the trailer hitch suspension system includes a pair of hydraulically-operated actuators that act through the hitching means in causing the trailer chassis to help support the motor vehicle chassis.

11. A trailer hitch for hitching a load-transporting trailer to a motor vehicle as set forth in claim 1 wherein
the trailer chassis has a pivot pin fixed thereto, and
the hitching means includes latching means adapted to releasbly grasp the pivot pin and thereby hitch the trailer chassis to the motor vehicle chassis while allowing turning of the trailer chassis relative to the motor vehicle chassis.

12. A trailer hitch for hitching a load-transporting trailer to a motor vehicle as set forth in claim 1 wherein
the trailer chassis has a pivot pin fixed thereto,
the hitching means includes latching means adapted to releasably grasp the pivot pin and thereby hitch the trailer chassis to the motor vehicle chassis while allowing turning of the trailer chassis relative to the motor vehicle chassis, and
the trailer chassis has locking means adapted to prevent turning of the trailer chassis relative to the motor vehicle chassis when the trailer chassis is hitched to the motor vehicle chassis by the latching means and the motor vehicle chassis and trailer chassis are aligned.

13. A trailer hitch for hitching a load-transporting trailer to a motor vehicle as set forth in claim 1 wherein
the trailer chassis has a pivot pin fixed thereto,
the trailer hitch suspension system includes a pair of suspension arms and a pair of actuators,
the hitching means includes latching means adapted to releasably grasp the pivot pin and thereby hitch the trailer chassis to the motor vehicle chassis while allowing turning of the trailer chassis relative to the motor vehicle chassis,
the actuators are adapted to cooperate with the suspension arms in positioning the latching means to grasp the pivot pin, and
the actuators are also adapted to act on the hitching means in causing the trailer chassis to help support the motor vehicle chassis.

14. A trailer hitch for hitching a load transporting trailer to a motor vehicle as set forth in claim 1 wherein
the trailer chassis has a pivot pin fixed thereto,
the hitching means includes latching means adapted to releasably grasp the pivot pin and thereby readily releasably hitch the trailer chassis to the motor vehicle chassis while allowing turning of the trailer chassis relative to the motor vehicle chassis,
the trailer chassis has locking means adapted to prevent turning of the trailer chassis relative to the motor vehicle chassis when the trailer chassis is hitched to the motor vehicle chassis by the latching means and the motor vehicle chassis and trailer chassis are aligned,
the actuators are adapted to cooperate with the suspension arms in positioning the latching means to grasp the pivot pin, and
the actuators are also adapted to act on the hitching means in causing the trailer chassis to help support the motor vehicle chassis.

15. A trailer hitch for hitching a load-transporting trailer to a motor vehicle as set forth in claim 1 wherein
the trailer chassis is supported by three or more trailer axles individually suspended from the trailer chassis with a suspension system that provides spring action for isolating road induced trailer axle movement from the trailer chassis, and
the trailer hitch is adapted to hitch the trailer chassis to the motor vehicle chassis at a location on the trailer chassis rearward of the forward-most trailer axle.

16. A trailer hitch for hitching a load-transporting trailer to a motor vehicle as set forth in claim 1 wherein
the trailer hitch is suspended directly from the motor vehicle chassis by the trailer hitch suspension system, and
the trailer hitch is adapted to hitch the trailer chassis to the motor vehicle chassis and also stow the hitched trailer chassis on the motor vehicle chassis.

17. A trailer hitch for hitching a load-transporting trailer to a motor vehicle as set forth in claim 1 wherein
the motor vehicle chassis supports a load container,
the trailer hitch is suspended from the load container by the trailer hitch suspension system and thereby from the motor vehicle chassis, and
the trailer hitch is adapted to hitch the trailer chassis to the motor vehicle chassis via the load container and also stow the hitched trailer chassis on the load container.

18. A trailer hitch for hitching a load-transporting trailer to a motor vehicle as set forth in claim 1 wherein
the motor vehicle chassis supports a tiltable load container,
the trailer hitch is suspended from the tiltable load container by the trailer hitch suspension system and thereby from the motor vehicle chassis, and
the trailer hitch is adapted to hitch the trailer chassis to the motor vehicle chassis via the tiltable load container and stow the hitched trailer chassis on the tiltable load container.

19. A trailer hitch for hitching a load-transporting trailer to a motor vehicle as set forth in claim 1 wherein
the
the trailer chassis has a pivot pin fixed thereto,
the hitching means includes a carriage and latching means,
the carriage is suspended from the motor vehicle chassis by the trailer hitch suspension system,
the latching means is secured to the carriage in a fixed position, and
the latching means is adapted to releasably grasp the pivot pin and thereby readily releasably hitch the trailer chassis to the carriage and thus to the motor vehicle chassis via the hitching means and the trailer hitch suspension system.

20. A trailer hitch for hitching a load transporting trailer to a motor vehicle as set forth in claim 1 wherein
the trailer chassis has a pivot pin fixed thereto,
the hitching means includes a carriage, latching means and an actuator,
the carriage is suspended from the motor vehicle chassis by the trailer hitch suspension system,
the latching means is secured to the carriage in a manner permitting movement of the latching means relative to the carriage,
the latching means is adapted to releasably grasp the pivot pin and thereby readily releasably hitch the trailer chassis to the carriage and thus to the motor vehicle chassis, and
the actuator is adapted to move and position the latching means relative to the carriage for engagement with the pivot pin.

21. A trailer hitch for hitching a load-transporting trailer to a motor vehicle wherein the motor vehicle has a chassis supported by motor vehicle axles suspended from the motor vehicle chassis, the load-transporting trailer has a chassis supported by two trailer axles individually suspended from the trailer chassis with a suspension system that provides spring action for isolating road induced trailer axle movement from the trailer chassis, the trailer hitch comprises a suspension system and hitching means, the trailer hitch suspension system suspends the hitching means from the motor vehicle chassis and applies a controllable resisting force or downwardly acting force on the hitching means during hitching operation, and the hitching means releasably attaches the trailer chassis to the motor vehicle chassis and causes the trailer chassis to support the motor vehicle to a variable degree by acting on the trailer chassis in a manner determined by (a) the existing trailer axle suspension system spring action, (b) the existing transportable load supported by the trailer chassis, and (c) the force applied on the hitching means by the trailer hitch suspension system.

22. A trailer hitch for hitching a load-transporting trailer to a motor vehicle as set forth in claim 21 wherein the trailer axle suspension systems have air springs supplied with a controllable air pressure, and the trailer hitch suspension system is adapted to forcibly resist upward trailer chassis movement by the air springs in causing the trailer chassis to help support the motor vehicle chassis to a variable degree.

23. A trailer hitch for hitching a load-transporting trailer to a motor vehicle as set forth in claim 21 wherein the trailer axle suspension systems have air springs with a set air pressure, and the trailer hitch suspension system is adapted to force downward trailer chassis movement against the action of the air springs in causing the trailer chassis to help support the motor vehicle chassis to a variable degree.

24. A trailer hitch for hitching a load-transporting trailer to a motor vehicle as set forth in claim 21 wherein the trailer axle suspension systems have elastic springs with a set spring action, and the trailer hitch suspension system is adapted to force downward trailer chassis movement against the action of the elastic springs in causing the trailer chassis to help support the motor vehicle chassis to a variable degree.

25. A trailer hitch for hitching a load-transporting trailer to a motor vehicle as set forth in claim 21 wherein the hitching means is adapted to allow the trailer chassis to turn relative to the motor vehicle chassis and prevent such turning.

26. A trailer hitch for hitching a load-transporting trailer to a motor vehicle as set forth in claim 21 wherein the trailer axles have self-steering wheels.

27. A trailer hitch for hitching a load-transporting trailer to a motor vehicle as set forth in claim 21 wherein the trailer axle suspension systems each comprise a pair of pneumatically-operated actuators and a pair of air springs, the actuators are adapted to establish the associated trailer axle in a retracted location under the trailer chassis when supplied with air pressure and the air springs associated with the trailer axles are exhausted of air pressure to thereby compact the trailer axles with respect to the trailer chassis, and the air springs are adapted to extend the associated trailer axle from the retracted location and provide the spring action associated therewith when the air springs are supplied with air pressure and the actuators associated with the trailer axles are exhausted of air pressure.

28. A trailer hitch for hitching a load-transporting trailer to a motor vehicle as set forth in claim 21 wherein the trailer chassis is supported by three or more trailer axles individually suspended from the trailer chassis with a suspension system that provides spring action for isolating road induced trailer axle movement from the trailer chassis.

29. A trailer hitch for hitching a load-transporting trailer to a motor vehicle as set forth in claim 21 wherein the trailer chassis is supported by three or more trailer axles individually suspended from the trailer chassis with a suspension system that provides spring action for isolating road induced trailer axle movement from the trailer chassis, and the trailer hitch is adapted to hitch the trailer chassis to the motor vehicle chassis at a location on the trailer chassis rearward of the forward-most trailer axle.

30. A trailer hitch for hitching a load-transporting trailer to a motor vehicle as set forth in claim 21 wherein the trailer hitch suspension system includes a pair of actuators that act through the hitching means on the trailer chassis in causing the trailer chassis to help support the motor vehicle chassis.

31. A trailer hitch for hitching a load-transporting trailer to a motor vehicle as set forth in claim 21 wherein the trailer hitch suspension system includes a pair of actuators that act through the hitching means on the trailer chassis at a location between the two trailer axles in causing the trailer chassis to help support the motor vehicle chassis.

32. A trailer hitch for hitching a load-transporting trailer to a motor vehicle as set forth in claim 21 wherein the trailer hitch suspension system includes a pair of hydraulically-operated actuators that act through the hitching means on the trailer chassis at a location substantially midway between the two trailer axles in causing the trailer chassis to help support the motor vehicle chassis.

33. A trailer hitch for hitching a load-transporting trailer to a motor vehicle as set forth in claim 21 wherein the trailer axle suspension systems have air springs providing the spring action, and the trailer hitch suspension system includes a pair of actuators that act through the trailer hitching means on the trailer chassis in a manner determined by the action of the air springs in causing the trailer chassis to help support the motor vehicle chassis.

34. A trailer hitch for hitching a load-transporting trailer to a motor vehicle as set forth in claim 21 wherein the trailer axle suspension systems have elastic springs providing the spring action, and the trailer hitch suspension system includes actuators that act through the hitching means on the trailer chassis in a manner determined by the action of the elastic springs in causing the trailer chassis to help support the motor vehicle chassis.

35. A trailer hitch for hitching a load-transporting trailer to a motor vehicle as set forth in claim 21 wherein the trailer chassis has a pivot pin fixed thereto, the hitching means includes latching means, and the latching means is adapted to releasably grasp the pivot pin and thereby readily releasably hitch the trailer chassis via the trailer hitch suspension system to the motor vehicle chassis while allowing turning of the trailer chassis relative to the motor vehicle chassis.

36. A trailer hitch for hitching a load-transporting trailer to a motor vehicle as set forth in claim 21 wherein
the trailer chassis has a pivot pin fixed thereto,
the hitching means includes latching means,
the latching means is adapted to releasably grasp the pivot pin and thereby readily realeasably hitch the trailer chassis via the trailer hitch suspension system to the motor vehicle chassis while allowing turning of the trailer chassis relative to the motor vehicle chassis, and
the trailer chassis has locking means adapted to prevent turning of the trailer chassis relative to the motor vehicle chassis when the trailer chassis is hitched to the motor vehicle chassis and the motor vehicle chassis and trailer chassis are aligned.

37. A trailer hitch for hitching a load-transporting trailer to a motor vehicle as set forth in claim 21 wherein
the trailer chassis has a pivot pin fixed thereto at a location between the two axles,
the trailer hitch suspension system includes pair of suspension arms and a pair of actuators,
the hitching means includes latching means adapted to releasably grasp the pivot pin and thereby readily releasably hitch the trailer chassis via the trailer hitch suspension system to the motor vehicle chassis while allowing turning of the trailer chassis relative to the motor vehicle chassis, and
the actuators are adapted to cooperate with the suspension arms in positioning the latching means to grasp the pivot pin and also act on the trailer chassis through the trailer hitching means at a location between the two trailer axles in causing the trailer chassis to help support the motor vehicle chassis.

38. A trailer hitch for hitching a load transporting trailer to a motor vehicle as set forth in claim 21 wherein
the trailer chassis has a pivot pin fixed thereto at a location between the two axles,
the trailer hitch suspension system includes a pair of suspension arms and a pair of actuators,
the hitching means includes latching means adapted to releasably grasp the pivot pin and thereby readily releasably hitch the trailer chassis via the trailer hitch suspension system to the motor vehicle chassis while allowing turning of the trailer chassis relative to the motor vehicle chassis, and
the actuators are adapted to cooperate with the suspension arms in positioning the latching means to grasp the pivot pin and also act via the hitching means on the trailer chassis in causing the trailer chassis to help support the motor vehicle chassis.

39. A trailer hitch for hitching a trailer to a motor vehicle as set forth in claim 21 wherein
the trailer chassis has a pivot pin fixed thereto,
the trailer hitch suspension system includes a pair of suspension arms and a pair of hydraulically-operated actuators,
the hitching means includes latching means adapted to releasably grasp the pivot pin and thereby readily releasably hitch the trailer chassis via the trailer hitch suspension system to the motor vehicle chassis while allowing turning of the trailer chassis relative to the motor vehicle chassis,
the trailer chassis has locking means adapted to prevent turning of the trailer chassis relative to the motor vehicle chassis when the trailer chassis is hitched to the motor vehicle chassis by the latching means and the motor vehicle chassis and trailer chassis are aligned, and
the actuators are adapted to cooperate with the suspension arms in positioning the latching mechanism to grasp the pivot pin and also act through the hitching means on the trailer chassis in causing the trailer chassis to help support the motor vehicle chassis.

40. A trailer hitch for hitching a load-transporting trailer to a motor vehicle as set forth in claim 21 wherein
the trailer chassis has a pivot pin fixed thereto,
the trailer hitch suspension system includes a pair of suspension arms and a pair of hydraulically-operated actuators,
the hitching means includes latching means adapted to releasably grasp the pivot pin and thereby readily releasably hitch the trailer chassis to the motor vehicle chassis via the trailer hitch suspension system while allowing turning of the trailer chassis relative to the motor vehicle chassis,
the trailer chassis has locking means adapted to prevent turning of the trailer chassis relative to the motor vehicle chassis when the trailer chassis is hitched to the motor vehicle chassis and the motor vehicle chassis and trailer chassis are aligned, and
the actuators are adapted to cooperate with the suspension arms in positioning the latching means to grasp the pivot pin and also act through the hitching means on the trailer chassis in causing the trailer chassis to help support the motor vehicle chassis.

41. A trailer hitch for hitching a load-transporting trailer to a motor vehicle as set forth in claim 21 wherein
the hitching means is suspended directly from the motor vehicle chassis by the trailer hitch suspension system, and
the trailer hitch is adapted to hitch the trailer chassis to the motor vehicle chassis and then stow the trailer chassis on the motor vehicle chassis.

42. A trailer hitch for hitching a load-transporting trailer to a motor vehicle as set forth in claim 21 wherein
the motor vehicle chassis supports a load container,
the hitching means is suspended from the load container by the trailer hitch suspension system and thereby from the motor vehicle chassis, and
the trailer hitch is adapted to hitch the trailer chassis to the motor vehicle chassis and stow the hitched trailer chassis on the load container.

43. A trailer hitch for hitching a load-transporting trailer to a motor vehicle as set forth in claim 21 wherein
the motor vehicle chassis supports a tiltable load container,
the trailer hitch is suspended from the tiltable load container by the trailer hitch suspension system and thereby from the motor vehicle chassis, and
the trailer hitch is adapted to hitch the trailer chassis to the motor vehicle chassis and stow the hitched trailer chassis on the tiltable load container.

44. A trailer hitch for hitching a load-transporting trailer to a motor vehicle as set forth in claim 21 wherein
the trailer chassis has a pivot pin fixed thereto,
the hitching means includes a carriage and latching means, and
the latching means is secured to the carriage in a fixed position and adapted to releasably grasp the pivot pin and thereby readily releasably hitch the trailer chassis to the carriage and thus to the motor vehicle chassis via the hitching means and trailer hitch suspension system.

45. A trailer hitch for hitching a load-transporting trailer to a motor vehicle as set forth in claim 21 wherein the trailer chassis has a pivot pin fixed thereto, the hitching means includes a carriage, latching means and an actuator, the latching means is secured to the carriage in a manner permitting movement of the latching means relative to the carriage, the latching means is adapted to releasably grasp the pivot pin and thereby readily releasably hitch the trailer chassis to the carriage and thus to the motor vehicle chassis via the hitching means and trailer hitch suspension system, and the actuator is adapted to move and position the latching means relative to the carriage for engagement of the latching means with the pivot pin.

46. A trailer hitch for hitching a load-transporting trailer to a motor vehicle as set forth in claim 21 wherein the trailer chassis supports a dump body, the trailer axle suspension systems have air springs supplied with a controllable air pressure, and the trailer axle suspension systems are adapted to cooperatively cause the trailer chassis and thereby the dump body to tilt to dump a load.

\* \* \* \* \*